United States Patent
Mutton

(10) Patent No.: US 9,992,519 B2
(45) Date of Patent: *Jun. 5, 2018

(54) TECHNIQUES FOR TRANSCODING CONTENT IN PARALLEL ON A PLURALITY OF MACHINES

(71) Applicant: Akamai Technologies, Inc., Cambridge, MA (US)

(72) Inventor: James A. Mutton, Maple Valley, WA (US)

(73) Assignee: Akamai Technologies, Inc., Cambridge, MA (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/219,064

(22) Filed: Jul. 25, 2016

(65) Prior Publication Data

US 2016/0337675 A1    Nov. 17, 2016

Related U.S. Application Data

(63) Continuation of application No. 13/667,272, filed on Nov. 2, 2012, now Pat. No. 9,432,704.

(Continued)

(51) Int. Cl.
*H04L 29/06* (2006.01)
*H04N 21/2343* (2011.01)
(Continued)

(52) U.S. Cl.
CPC ... *H04N 21/234309* (2013.01); *H04L 65/601* (2013.01); *H04N 19/177* (2014.11); *H04N 19/40* (2014.11); *H04N 21/8456* (2013.01)

(58) Field of Classification Search
CPC .... H04L 65/601; H04N 19/177; H04N 19/40; H04N 21/234309; H04N 21/8456
(Continued)

(56) References Cited

U.S. PATENT DOCUMENTS 8,155,211 B2* 4/2012 Schoenblum ........ H04N 19/147
375/240.03
2004/0237097 A1* 11/2004 Covell .............. H04L 29/06027
725/16

(Continued)

OTHER PUBLICATIONS

Cai-dong et al, The investigation of cloud-computing-based image mining mechanism in mobile communication WEB on Android, 2010.*

(Continued)

*Primary Examiner* — Shan E Elahi

(57) ABSTRACT

The subject matter herein generally relates to transcoding content, typically audio/video files though not limited to such, from one version to another in preparation for online streaming or other delivery to end users. Such transcoding may involve converting from one format to another, or creating multiple versions of an original source file in different bitrates, frame-sizes, or otherwise, to support distribution to a wide array of devices and to utilize performance-enhancing technologies like adaptive bitrate streaming. A transcoding platform is described herein that, in certain embodiments, leverages distributed computing techniques to transcode content in parallel across a platform of machines that are preferably idle or low-utilization resources of a content delivery network. The transcoding system also utilizes, in certain embodiments, improved techniques for segmenting the original source file so as to enable different segments to be sent to different machines for parallel transcodes.

4 Claims, 18 Drawing Sheets

Related U.S. Application Data

(60) Provisional application No. 61/556,236, filed on Nov. 6, 2011, provisional application No. 61/556,237, filed on Nov. 6, 2011.

(51) Int. Cl.
  *H04N 21/845* (2011.01)
  *H04N 19/40* (2014.01)
  *H04N 19/177* (2014.01)

(58) Field of Classification Search
  USPC .................................................. 375/240.26
  See application file for complete search history.

(56) References Cited

U.S. PATENT DOCUMENTS

| | | | |
|---|---|---|---|
| 2008/0037656 A1* | 2/2008 | Hannuksela | H04N 21/23614 375/240.26 |
| 2009/0161766 A1* | 6/2009 | Bronstein | H04N 19/132 375/240.23 |
| 2009/0323809 A1* | 12/2009 | Raveendran | H04N 19/46 375/240.16 |
| 2010/0131674 A1* | 5/2010 | Vecchio | H04N 21/2343 709/246 |
| 2010/0161825 A1 | 6/2010 | Ronca | |
| 2012/0254280 A1* | 10/2012 | Parker, II | G06F 9/5044 709/201 |

OTHER PUBLICATIONS

Song et al, Design and realization of distributed nodes in a multi-level-P2P content delivery network, Aug. 24-27, 2010.*

Hofmann, Markus et al., "Caching Techniques for Streaming Multimedia over the Internet", Bell Labs Technical Report, Jul. 1999, according to http://www.cs.rice.edu/~eugeneng/puublications.html, available at http://www.cs.rice.edu/~eugeneng/papers/soccer.pdf ; downloaded Mar. 10, 2017, 11 pages.

Hofmann, Markus et al., "Caching Techniques for Streaming Multimedia over the Internet", SOCCER 2000 DRAFT, http://citeseerx.ist.psu.edu/viewdoc/download?doi=10.1.1.34.4278&rep=rep1&type=pdf downloaded Mar. 10, 2017, 2000, 11 pages.

Ng, Tze Sing Eugene et al., "Architecture and Mechanisms for High Quality Streaming Multimedia", Intern presentation 1999 related to Markus Hofmann, et al, "Caching Techniques for Streaming Multimedia over the Internet", Bell Labs Technical Report, Jul. 1999 , according to http://www.cs.rice.edu/~eugeneng/presentations/publications.html, downloaded Mar. 10, 2017 from http://www.cs.rice.edu/~eugeneng/presentations/soccer.pdf, 71 pages.

Sambe et al.., High Speed Distributed Video Transcoding for Multiple Rates and Formats, IECE Trans. Inf. & Syst vol. E88-D, No. 8, Aug. 2005, pp. 1923-1931.

Sambe et al.., Distributed Video Transcoding and its Application to Grid Delivery, The 9th Asia-Pacific Conference on Communications, Sep. 2003, vol. 1, pp. 98-102.

Sanson, et al., Scalable Distributed Architecture for Media Transcoding, downloaded on Sep. 12, 2017, 15 pages. ICA3PP 2012, pp. 228-302. Available at http://allm.net/wp-content/uploads/2014/10/rd2012_01_2_ica3pp_paper.pdf.

Sanson, et al., Scalable Distributed Architecture Media Transcoding, downloaded on Sep. 12, 2017, 15 pages. Available at https://s3.amazonaws.com/academia.edu.documents/33466040/2012_09_ica3pp_2012.pdf?, available at: AWSAccessKeyId=AKIAIWOWYYGZ2Y53UL3A&Expires=1505235657&Signature=QJVQhie4mkbEcv3QtnEAs57wrqQ%3D&response-content-disposition=inline%3B%20filename%3DScalable_Distributed_Architecture_for_Me.pdf.

* cited by examiner

| Current GoP; frames 1-250 | | | Next GoP; frames 250-500 | |
|---|---|---|---|---|
| NewGoP1 1-90 | NewGoP2 91-180 | NewGoP3 181-270 | NewGoP4 271-360 | |

Pseudo Chunk Segmentation For Parallel Transcoding

TECHNIQUES FOR TRANSCODING CONTENT IN PARALLEL ON A PLURALITY OF MACHINES

CROSS-REFERENCE TO RELATED APPLICATIONS

This application is a continuation of U.S. application Ser. No. 13/667,272, filed Nov. 2, 2012, which claims the benefit of priority of U.S. Provisional Application No. 61/556,236, filed Nov. 6, 2011, and of U.S. Provisional Application No. 61/556,237, filed Nov. 6, 2011, the teachings of all of which are hereby incorporated by reference in their entireties.

BACKGROUND

Technical Field

This disclosure relates generally to computer systems for processing of media files, and other content, using distributed computing techniques.

Brief Description of the Related Art

Content providers (such as large-scale broadcasters, film distributors, and the like) desire to distribute their content online in a manner that complements traditional mediums such as broadcast TV (including high definition or "HD" television) and DVD. It is important to them to have the ability to distribute content to a wide variety of third-party client application/device formats, and to offer a quality viewing experience regardless of network conditions, using modern technologies like adaptive bitrate streaming. Notably, since Internet-based content delivery is no longer limited to fixed line environments such as the desktop, and more and more end users now use mobile devices to receive and view content in wireless environments, the ability to support new client device formats and new streaming technologies is particularly important.

Media files are one common kind of content that content providers distribute. A media file may be single-media content (e.g., audio-only media) or the media file may comprise multiple media types, i.e., a multimedia file with audio/video data. Generally speaking, a given multimedia file is built on data in several different formats. For example, the audio and video data are each encoded using appropriate codecs, which are algorithms that encode and compress that data. Example codecs include H.264, VP6, AAC, MP3, etc. A container or package format that functions as a wrapper and describes the data elements and metadata of the multimedia file, so that a client application knows how to play it. Example container formats include Flash, Silverlight, MP4, PIFF, and MPEG-TS.

The bit rate at which to encode the audio and video data must be selected. An encoding with a lower bitrate and smaller frame size (among other factors) generally will be easier to stream reliably, since the amount of data will be smaller, but the quality of the experience will suffer. Likewise, an encoding at a higher-bitrate and a larger frame will be a higher quality experience, but is more likely to lead to interrupted and/or poor quality streams due to network delivery issues. Current adaptive bitrate streaming technologies require multiple streams each encoded at a different bitrate, allowing the client and/or server to switch between streams in order to compensate for network congestion.

While other kinds of media files (like an audio-only file) may be somewhat less complex than the multimedia file described above, they nevertheless present similar issues in terms of encoding and formatting, stream quality tradeoffs, and player compatibility.

Hence, to support the distribution of content to a wide variety of devices, content providers typically must create many different versions of their content. For example, they often will create multiple copies of a given movie title at different screen sizes, bit rates, quality levels and client player formats. Furthermore, over time they may want to change formats, for example by updating the encoding (e.g., to take advantage of newer codecs that compress content more efficiently). They may also need to change the container format to accommodate new client environments, a process often referred to as transmuxing. Failing to provide certain bit rates or poor encoding practices will likely reduce the quality of the stream. But generating so many different versions of content, as well as converting from one to another and storing them, is a time-consuming and costly process that is difficult to manage.

For online delivery (e.g., streaming, download) of these various versions of content, content providers often use distributed computing systems to deliver their content. One such distributed computer system is a "content delivery network" or "CDN" that is operated and managed by a service provider. The service provider typically provides the content delivery service on behalf of third parties. A "distributed system" of this type typically refers to a collection of autonomous computers linked by a network or networks, together with the software, systems, protocols and techniques designed to facilitate various services, such as content delivery or the support of outsourced site infrastructure. Typically, "content delivery" means the storage, caching, or transmission of content, streaming media and applications on behalf of content providers, including ancillary technologies used therewith including, without limitation, DNS query handling, provisioning, data monitoring and reporting, content targeting, personalization, and business intelligence.

A content delivery network such as that just described typically supports different content formats, and offers many advantages for accelerating the delivery of content, once created. However, the content provider still faces the problem of creating and managing the creation of all of the various versions of content that it desires and/or that are necessary.

Thus, there is a need to provide methods and systems for generating, preparing and transforming streaming content in an efficient and scalable way. There is also a need to provide such functionality in a way that is compatible with delivery solutions so as to provide an overall end-to-end solution for content providers. The teachings herein address these needs and offer other features and advantages that will become apparent in view of this disclosure.

SUMMARY

The subject matter herein generally relates to transcoding content, typically audio/video files though not limited to such. Typically the transcoding is performed in preparation for online streaming or other delivery to end users. Such transcoding may involve converting from one format to another (e.g., converting codecs or container formats), or creating multiple versions of an original source file in different bitrates, resolutions, or otherwise, to support distribution to a wide array of devices and to utilize performance-enhancing technologies like adaptive bitrate streaming. This disclosure describes a transcoding platform that, in certain embodiments, leverages distributed computing techniques to transcode content in parallel across a platform of machines that are preferably idle or low-utilization resources of a content delivery network. The transcoding system also utilizes, in certain embodiments, improved techniques for breaking up the original source file that are performed so that different segments of the file can be sent to different machines for transcoding in parallel.

In one embodiment, a transcoding platform is made up of distributed transcoding resources, typically servers with available processing power and programmed to assist in the transcoding function. These transcoding resources may be dedicated machines as well as machines that are shared with other functions. In particular, the machines can be idle or low-utilization HTTP proxy servers (relative to other such proxy servers) in a content delivery network. While these machines may spend much of their time receiving and responding to client requests for content, and otherwise facilitating delivery of online content to requesting end-users, at certain times (in the middle of night in their local time zone, for example) they may be relatively lightly-loaded, and hence available to perform certain transcoding tasks. The transcoding platform may also include a set of machine(s) that manage and coordinate the transcoding process. These machines may receive requests to perform a particular transcoding job, e.g., to convert a particular file from a first version to a second version. The request may come from a user interface (through which a content provider user of the platform uploads their content to be transcoded, for instance), from a network storage system, or from components in the content delivery network that are streaming content (e.g., that need to be able to deliver a particular format to a requesting end-user client), including one of the proxy servers. As appropriate, depending on the foregoing circumstances, the transcoding job may be designated with a priority level, which may correspond semantically to a "live", "real-time" or "batch" mode conversion. In some cases, the proxy servers are only used if the priority level is below a certain threshold because the proxy servers are considered to be unreliable for transcoding tasks. Indeed, proxy servers may operate such that content delivery processes (e.g., responding to client requests) take priority over transcoding tasks when allocating processing time within the proxy server.

Continuing with the current example, a machine(s) managing the transcoding process obtains a list of candidate servers for performing transcoding tasks. This list may include the results of a lookup into the content delivery network's monitoring and mapping system to determine which proxy servers within the network are currently experiencing a relatively light load for content delivery services, as measured by such metrics as processor (CPU), memory, or disk utilization, and/or client request rate, etc. The management machine retrieves the file to be transcoded and breaks it up into segments suitable to be independently converted. These segments are then sent to the various transcoding resources (e.g., the proxy servers or the dedicated machines) distributed across the platform, which given the nature of the content delivery network may be global in nature. Also sent along are instructions with parameters about the desired transcode operation and/or target format. Each transcoding resource performs its task independently, e.g., decoding the chunk that it is given and re-encoding with the appropriate parameters. It then returns the result to the management machine(s), which reassembles the new segments into the new file. Thus, for example, the proxy servers can continue to service client requests for content (the proxy process) while performing the transcode process with residual resources.

Because proxy servers are responsible for servicing client requests, that process typically takes priority over the transcoding process. In some cases, the proxy server may determine that it cannot complete the transcode request and may send a message back to the management machine with an error or otherwise indicating it will not complete the transcode. Typically this would occur if the proxy server's load began to increase or to exceed a particular threshold.

The transcoding process may involve changing any of a variety of characteristics of the file, for example and without limitation, changing a codec used to encode data in the file, changing a container format of the file, and/or changing one or more encoding parameters or container format parameters. Thus the transcoding process may involve changing a bit-rate of encoded data in the file, an image resolution for data in the file, a frame size for data in the file, an aspect ratio for data in the file, a compression setting used to encode data in the file, other settings such as GoP settings, color spaces, stereo/audio settings, etc. The transcoding process may also involve changing other characteristics, such as an interlacing characteristic for data in the file. In addition, the system may be used to change or add security features to the file, e.g., by applying encryption, embedding a watermark or a fingerprint in the content, or inserting data to apply a digital rights management scheme to the file.

In some cases, when the source file is a video, the platform uses a pseudo-chunking approach for breaking up the video file to create the transcoding segments. For example, the management machine(s) can be configured to be frame-aware, such that it can include "additional" frames in a given segment to enhance the ability for a given transcoding resource to transcode that segment independently of other frame information in the file. This is advantageous and sometimes necessary because the transcoding resource usually will not receive the entire original source file. Such pseudo-chunking techniques are useful when the transcode involves modifying the size of GoPs, the rate of keyframes in the source file is relatively high, or the source file contains so-called open GoPs, among other scenarios.

More specifically, in some embodiments, a frame-aware segmentation process (e.g. in the management server) can receive a video file that is to be converted from a first version to a second version. The video file is typically made up of a plurality of frames organized into a plurality of groups-of-pictures (GoPs). The segmenter examines frames in the file to identify a given GoP and to determine the type of frames in the given GoP, and creates a segment that includes frames beyond those in the given GoP. This segment is then sent off to be independently transcoded as described above.

The inclusion of the additional frames may occur because the segmenter determines that the given GoP cannot be divided into a whole number of target GoPs (the target GoPs representing desired GoPs for the second version and having a smaller number of frames), in which case the segmenter can create the segment from the file to include at least some frames in the given GoP and at least one frame from a GoP immediately following the given GoP.

Another possibility is that the target GoP is larger than the given GoP, and that it is not a whole-number-multiple of the size of the given GoP, in which case the segmenter can create the segment to include the given GoP and at least enough frames from GoPs immediately following the given GoP such that the segment reaches the size of the target GoP.

Another possibility is that the segmenter identifies the given GoP as an open-GoP, and therefore creates the segment to include all of the frames from the given GoP and frames (e.g., up to and including a keyframe) from a GoP immediately following the given GoP.

Yet another possibility is that the segmenter determines that the given GoP contains a number of frames that is less than a predetermined minimum number of frames, and so creates the segment to include the given GoP and at least enough additional frames so as to reach that predetermined minimum number of frames.

As those skilled in the art will recognize, the foregoing merely refers to non-limiting embodiments of the subject matter disclosed herein. The teachings hereof may be realized in a variety of systems, methods, apparatus, and non-transitory computer-readable media. It is also noted that the allocation of functions to different machines is not limiting, as the functions recited herein may be combined or split amongst different machines in a variety of ways.

BRIEF DESCRIPTION OF THE DRAWINGS

The subject matter herein will be more fully understood from the following detailed description taken in conjunction with the accompanying drawings, in which.

DETAILED DESCRIPTION

The following description sets forth non-limiting embodiments to provide an overall understanding of the principles of the structure, function, manufacture, and use of the methods, systems, and apparatus disclosed herein. The methods, systems, and apparatus described herein and illustrated in the accompanying drawings are non-limiting examples; the scope of the present invention is defined solely by the claims. The features described or illustrated in connection with one exemplary embodiment may be combined with the features of other embodiments. Such modifications and variations are intended to be included within the scope of the present invention. All patents, publications and references cited herein are expressly incorporated herein by reference in their entirety.

The subject matter hereof provides improved ways to convert audio/video content (or other content) from one codec format to another, or from one container format to another, and/or that have different encoding/formatting settings, to generate multiple versions of a file. For example, the conversions may involve changing the bitrate (e.g., 10 Mbps to 500 kps), frame size, aspect ratio, or in changing compression settings (other than bitrate), and/or other characteristics such as GoP settings, color spaces, stereo/audio choices, sample rates, etc. The process may also involve changing other characteristics, such as whether interlacing is used. In addition, in some applications the teachings hereof may be used to change or add security features, such as encryption or watermarking, as will be described in more detail below. The term transcoding is used herein to refer to performing any or all of such transformations on a given piece of content; however it is not limited to such transformations, which are merely examples provided for illustrative purposes.

In many embodiments, the transcoding techniques disclosed herein preferably are implemented in a distributed computing platform such as a content delivery network (CDN), and preferably one that can not only perform transcoding services but also the deliver the transcoded content. An example of a content delivery network platform is now described.

Content Delivery Network

Figure 1:
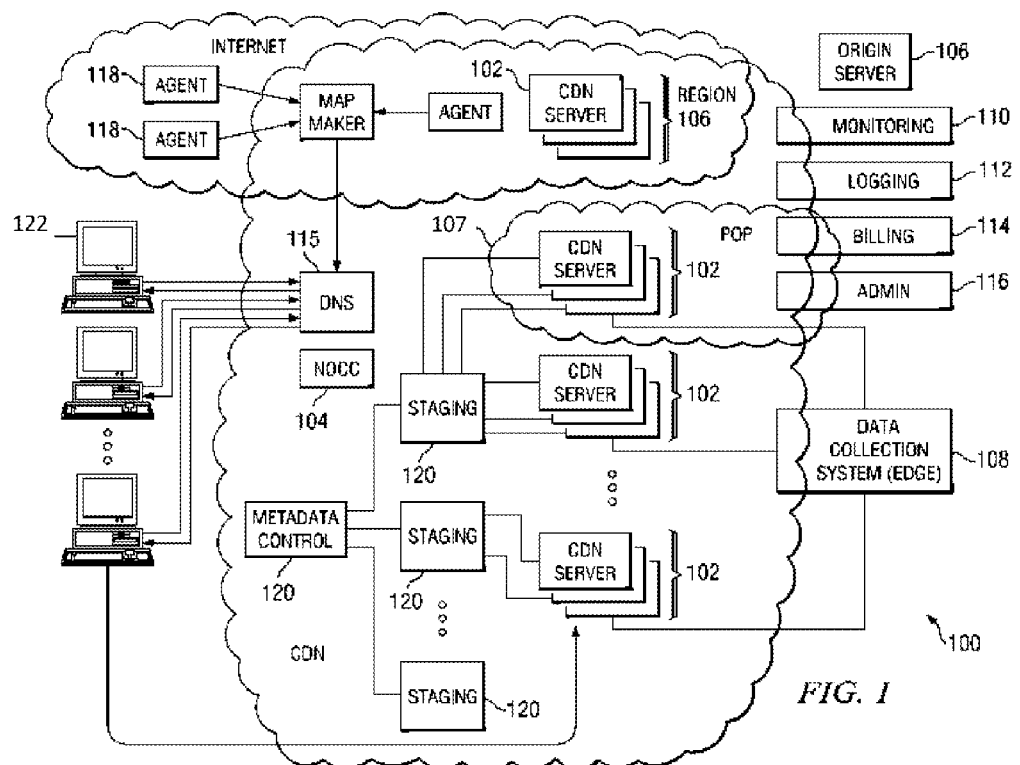
FIG. 1 is a diagram illustrating one embodiment of a known distributed computer system configured as a content delivery network.

FIG. 1 illustrates a known distributed computer system 100 is configured as a CDN and is assumed to have a set of machines 102 distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded web page objects, streaming media, software downloads, and the like) to the distributed computer system 100 and, in particular, to the CDN's content servers 102 (sometimes referred to as "edge" servers in light of their location near the "edges" of the Internet, or as proxy servers if running an HTTP proxy or other proxy process, as is typical and as is described further below in connection with FIG. 2). Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data (e.g., from the CDN's content servers 102) to a DNS query handling mechanism 115, which is authoritative for content domains being managed by the CDN and which responds to DNS queries from end users by handing out, e.g., addresses for one or more of the content servers in the CDN. A distributed data transport mechanism 120 may be used to distribute control information (e.g., metadata to manage content, to facilitate load balancing, and the like) to the servers.

More detail about CDN operation can be found in U.S. Pat. Nos. 7,293,093 and 7,693,959, the disclosures of which are incorporated by reference.

Figure 2:
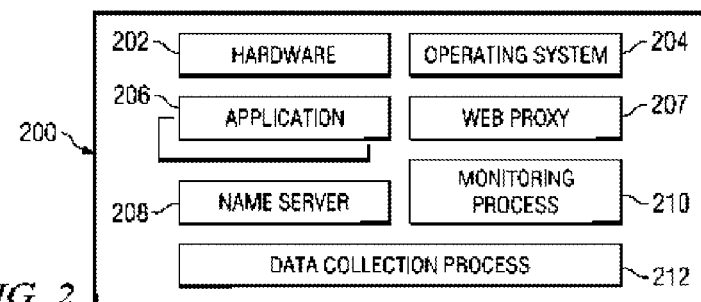
FIG. 2 is a diagram illustrating one embodiment of a machine on which a CDN server in the system of FIG. 1 may be implemented.

As illustrated in FIG. 2, a given machine 200 comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP web proxy 207 (sometimes referred to as a "global host" or "ghost" process), a name server 208, a local monitoring process 210, a distributed data collection process 212, and the like. The machine running the proxy 207 typically provides caching functionality for content passing therethrough, although it need not. For streaming media, the machine typically includes one or more media servers, such as a Windows Media Server (WMS) or Flash server, as required by the supported media formats.

A given content server is configured to provide one or more extended content delivery features, preferably on a domain-specific, customer-specific basis, preferably using configuration files that are distributed to the edge servers using a configuration system. A given configuration file preferably is WL-based and includes a set of content handling rules and directives that facilitate one or more advanced content handling features. The configuration file may be delivered to the content server via the data transport mechanism. U.S. Pat. Nos. 7,240,100 and 7,111,057 (the disclosures of which is hereby incorporated by reference) illustrates useful infrastructures for delivering and managing edge server content control information, and this and other edge server control information can be provisioned by the CDN service provider itself, or (via an extranet or the like) the content provider customer who operates the origin server. The CDN may provide secure content delivery among a client browser, edge server and customer origin server in the manner described in U.S. Publication No. 20040093419. Secure content delivery as described therein enforces SSL-based links between the client and the content server, on the one hand, and between the content server process and an origin server process, on the other hand. This enables an SSL-protected web page and/or components thereof to be delivered via the content server.

The CDN may include a network storage subsystem (sometimes referred to as "NetStorage"), such as described in U.S. Pat. No. 7,472,178, the disclosure of which is incorporated herein by reference.

Streaming Using a Content Delivery Network

The CDN described above may be designed to provide a variety of streaming services. For example, for fault tolerant streaming delivery, the CDN may include a delivery subsystem, such as described in U.S. Pat. No. 7,296,082, the disclosure of which is incorporated herein by reference.

In other streaming implementations, the CDN may be extended to provide an integrated HTTP-based delivery platform that provides for the delivery online of HD-video quality content to the most popular runtime environments and to the latest devices in both fixed line and wireless environments. An example of such a platform is set forth in U.S. Ser. No. 12/858,177, filed Aug. 17, 2010 (now published as US Patent Publication 2011/0173345, incorporated herein by reference). The platform described there supports delivery of both "live" and "on-demand" content. It should be noted that while some of the description below and otherwise in application Ser. No. 12/858,177 uses the context of the Adobe Flash runtime environment for illustrative purposes, this is not a limitation, as a similar type of solution may also be implemented for other runtime environments both fixed line and mobile (including, without limitation, Microsoft Silverlight, Apple iPhone, and others).

Figure 3:
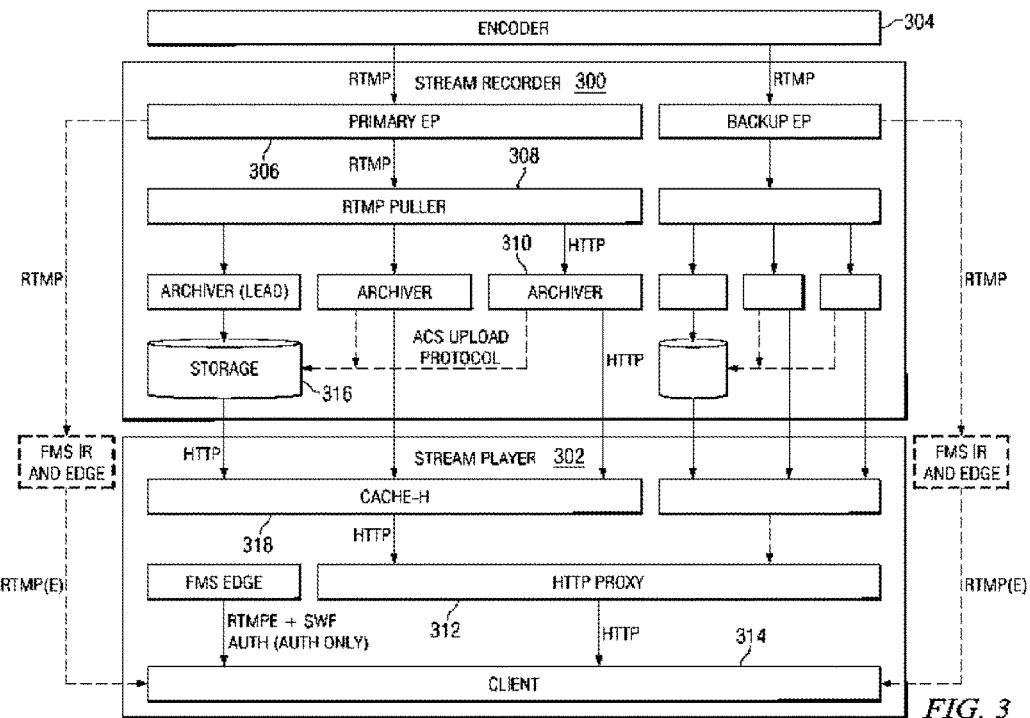
FIG. 3 is a diagram illustrating one embodiment of an architecture for live streaming delivery as described in U.S. application Ser. No. 12/858,177.

FIG. 3 illustrates an overview of an exemplary architecture for live streaming delivery as described in U.S. application Ser. No. 12/858,177, filed Aug. 17, 2010. As seen in the embodiment shown in FIG. 3, the system generally is divided into two independent tiers: a stream recording tier 300, and a stream player tier 302. The recording process (provided by the stream recording tier 300) is initiated from the Encoder 304 forward. Preferably, streams are recorded even if there are currently no viewers (because there may be DVR requests later). The playback process (provided by the stream player tier 302) plays a given stream starting at a given time. Thus, a "live stream," in effect, is equivalent to a "DVR stream" with a start time of "now."

Referring to FIG. 3, the live streaming process begins with a stream delivered from an Encoder 304 to an Entry Point 306. A Puller component 308 (e.g., running on a Linux-based machine) in an EP Region (not shown) is instructed to subscribe to the stream on the EP 306 and to push the resulting data to one or more Archiver 310 processes, preferably running on other machines. In this embodiment, one of the Archivers 310 may operate as the "leader" as a result of executing a leader election protocol across the archiving processes. Preferably, the Archivers 310 act as origin servers for a content server's HTTP proxy processes (an example of which is shown at 312) for live or near-live requests. The HTTP proxy 312 provides HTTP delivery to requesting end user clients, one of which is the Client 314. A representative Client 314 is a computer that includes a browser, typically with native or plug-in support for media players, codecs, and the like. If DVR is enabled, content preferably is also uploaded to the Storage subsystem 316, so that the Storage subsystem serves as the origin for DVR requests.

In operation, a request for content (e.g., from an end user Client 314) is directed to the HTTP proxy 312, preferably using techniques such as those described in U.S. Pat. Nos. 6,108,703, 7,240,100, 7,293,093 and others. When the HTTP proxy 312 receives an HTTP request for a given stream, it makes various requests, preferably driven by HTTP proxy metadata (as described in U.S. Pat. Nos. 7,240,100, 7,111,057 and others), possibly via a cache hierarchy 318 (see, e.g., U.S. Pat. No. 7,376,716 and others), to locate, learn about, and download a stream to serve to the Client 314. Preferably, the streaming-specific knowledge is handled by the HTTP proxy 312 that is directly connected to a Client 314. Any go-forward (cache miss) requests (issued from the HTTP proxy) preferably are standard HTTP requests. For example, when a Client 314 requests a particular stream, the HTTP proxy 312 starts the streaming process by retrieving a "Stream Manifest" that contains preferably attributes of the stream and information needed by the HTTP proxy 312 to track down the actual stream content.

For "live" requests, the HTTP proxy 312 starts requesting content relative to "now," which, in general, is approximately equal to the time at the content server's HTTP proxy process. Given a seek time, the HTTP proxy downloads a "Fragment Index" whose name preferably is computed based on information in the indexInfo range and an epoch seek time. Preferably, a Fragment Index covers a given time period (e.g., every few minutes). By consulting the Fragment Index, an "Intermediate Format (IF) Fragment" number and an offset into that IF fragment are obtained. The HTTP proxy 312 can then begin downloading the fragment (e.g., via the cache hierarchy 318, or from elsewhere within the CDN infrastructure), skipping data before the specified offset, and then begin serving (to the requesting Client 314) from there. In general, and unless the Stream Manifest indicates otherwise, for live streaming the HTTP proxy then continues serving data from consecutively-numbered IF Fragments.

In the context of live HTTP-based delivery, the Intermediate Format (IF) describes an internal representation of a stream used to get data from the Puller through to the HTTP proxy. A "source" format (SF) is a format in which the Entry Point 306 provides content and a "target" format (TF) is a format in which HTTP proxy 312 delivers data to the Client 314. These formats need not be the same. Thus, SF may differ from TF, i.e., a stream may be acquired in FLV format and served in a dynamic or adaptive (variable bit rate) format. The format is the container used to convey the stream; typically, the actual raw audio and video chunks are considered opaque data, although transcoding between different codecs may be implemented as well. By passing the formats through the HTTP proxy 312 (and delivering to the Client 314 via conventional HTTP), the container used to deliver the content can be changed as long as the underlying codecs can be managed appropriately.

The above-described architecture is useful for live streaming. The platform can also be used to support video on demand (VOD). In particular, the solution can provide VOD streaming from customer and Storage subsystem-based origins.

For VOD delivery, the stream recorder tier 300 (of FIG. 3) is replaced, preferably with a translation tier. As described in Ser. No. 12/858,177, filed Aug. 17, 2010, typically VOD content is off-loaded to the CDN for HTTP delivery. In one embodiment, a conversion tool (a script) is used to convert source content (such as FLV) to IF, with the resulting IF files then uploaded to the Storage subsystem. The HTTP proxy 312 then gets the content and the Stream Manifest from the Storage subsystem. Exemplary translation tier approaches are described in more detail in Ser. No. 12/858,177, filed Aug. 17, 2010.

Figure 4:
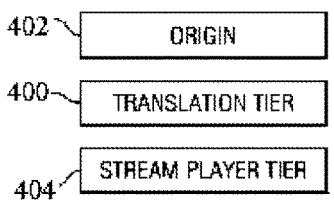
FIG. 4 is a diagram illustrating one embodiment of an architecture and request flow of a video-on-demand approach as described in U.S. application Ser. No. 12/858,177.

An architecture and request flow of a VOD approach is shown in FIG. 4. In this embodiment, a translation tier 400 is located between an origin 402 (e.g., customer origin server, or the Storage subsystem, or other source of content) and the stream player tier 404.

More detail about the above streaming architectures can be found in aforementioned U.S. application Ser. No. 12/858,177.

It is known that the above-described streaming architecture can be enhanced in a variety of ways, for example as set forth in U.S. patent application Ser. No. 13/329,057, filed Dec. 16, 2011, (now published as US Publication No. US 2012/0265853 and as WIPO Publication No. WO/2012/083298) the contents of which are hereby incorporated by reference.

Live Streaming Components

Figure 5:
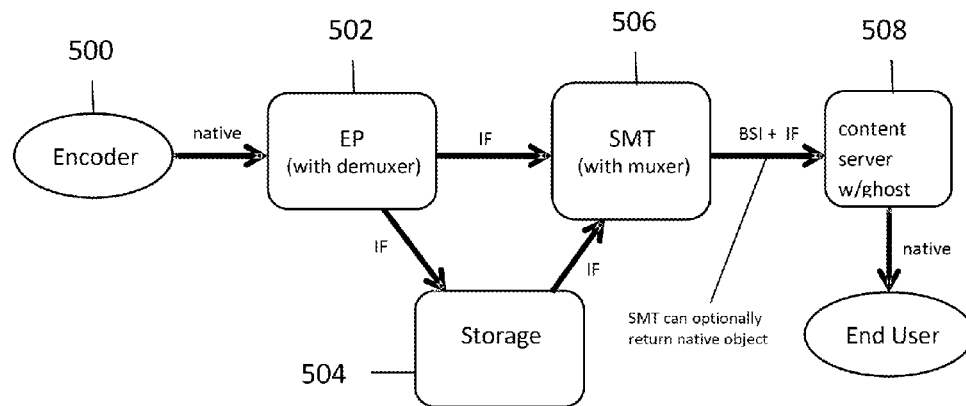
FIG. 5 is a schematic view of one embodiment of an architecture for live streaming, as described in U.S. application Ser. No. 13/329,057.

FIG. 5 is a high-level component diagram illustrating one embodiment of an architecture for streaming live content, as set forth in U.S. patent application Ser. No. 13/329,057. In this embodiment, the Entry Point (EP) 502 ingests the stream to be delivered from an encoder 500, demuxes the stream from its native format to an IF format, such as a fragmented format like f-MP4, and archives the stream to Storage 504 (typically a network storage subsystem). The EP 502 serves "current" live stream fragments to a Streaming Mid-Tier (SMT) process 506, which is typically running on a separate SMT machine. The SMT 506 retrieves "current" live stream fragments from EP 502, and it generates a muxed output in the desired native format. In an alternative embodiment, the SMT 506 generates muxing instructions for use by a content server running an HTTP proxy process 508 (again, sometimes referred to as "global host" or simply "ghost") in the CDN. The instructions are returned to the content server 508, along with the IF fragments if needed, although the IF fragments may have been previously cached by the content server 508 or retrieved by the content server from Storage 504 instead. The muxing instructions may be realized as binary-side-includes, or BSI, which is described in detail in U.S. patent application Ser. No. 13/329,057 and will be summarized below. The content server 508 forwards end-user requests to SMT 506, caches the response from SMT 506, which response either is a native output object for the stream or a BSI fragment, and, when BSI is used, the content server 508 also creates an output object from the BSI and IF fragment. The content server 508 also delivers the native output object to the end-user client, typically a client player application. It does not need to understand any container format(s). The Storage 504 stores an archive for DVR or VOD playback, and it also stores live stream session metadata.

On Demand Streaming Components

Figure 6:
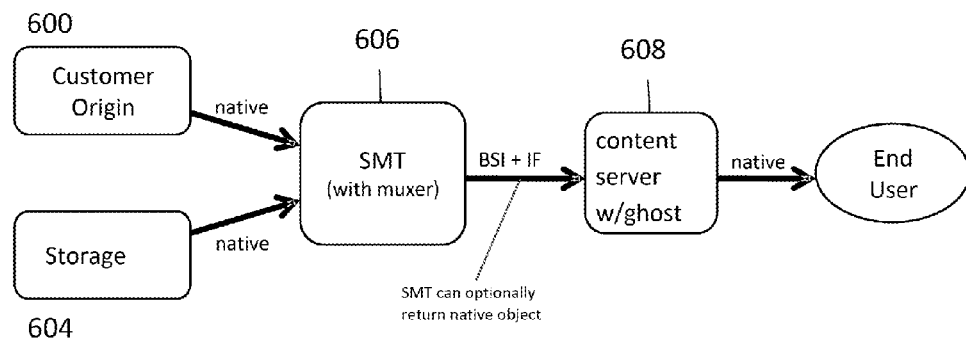
FIG. 6 is a schematic view of one embodiment of an architecture for on-demand streaming as described in U.S. application Ser. No. 13/329,057.

FIG. 6 is a high-level component diagram illustrating one embodiment of an architecture for streaming on-demand content. In this embodiment, the SMT 604 requests and receives the native on-demand file from either a customer origin 600 or Storage 604 (again, typically a network storage subsystem). The SMT 606 parses a native source file index and creates an intermediate MetaIndex. It also generates a muxed output object or SMT 606 generates muxing instructions (BSI or equivalent functionality) for use by the content server 608 to create the native object. The content server 608 forwards end-user requests to SMT 606, caches the response from SMT, which response either is a native output object or a BSI fragment, and, when BSI is used, the content server 608 also creates an output object from the BSI and IF fragment. Storage 604 typically stores on-demand files in native format.

Live Streaming Operation

Figure 7:
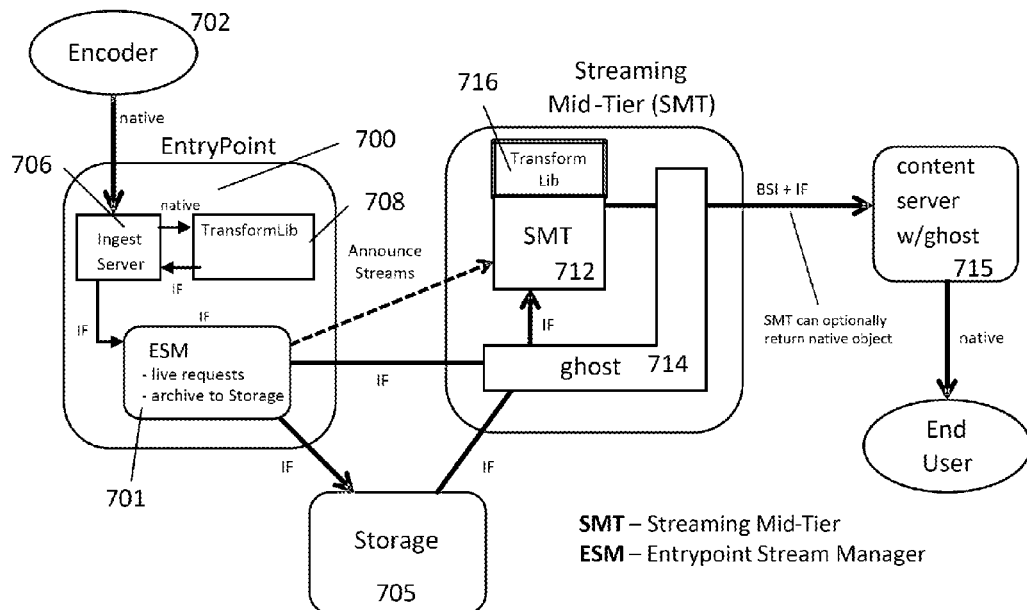
FIG. 7 is a schematic view illustrating the live streaming architecture of FIG. 5 in more detail as described in U.S. application Ser. No. 13/329,057.

FIG. 7 illustrates further details regarding the EP and SMT components and their respective functions.

In this embodiment, the EP 700 comprises two services: an ingest server 706 and an entry point stream manager (ESM) 701. The ingest server 706 is composed of a format-specific ingest server 706 and a library of functions 708, called TransformLib. The library 708 is a shared library that is linked into the ingest server 706. The library contains format-specific logic for muxing and demuxing. In operation, the ingest server 706 receives a stream from an encoder 702, authenticates the encoder 702, passes the received data to the library 708 for demuxing, and sends the demuxed stream to the ESM 701. The library, as noted above, demuxes from a native format (e.g., MP3, MPEG2-TS, or otherwise) to the IF, such as f-MP4. The ESM 710 is a format-independent component that preferably resides on the EP 700. The role of ESM 701 preferably is the same across different streaming formats. It received the demuxed stream from the ingest server 706, manages ESM publishing points, archives the stream to Storage 705, serves "current" live request from SMT, and announces active streams to all SMTs. An EP machine may be a Windows-based server, or a Linux-based server, or otherwise. Preferably, the ESM code is cross-platform compatible.

The SMT machine comprises two primary services; SMT 712 and local ghost process 714. The local HTTP proxy (ghost) process 714 handles incoming HTTP requests from an content server ghost process 715. In response, the local ghost process 714 makes a forward request to the local SMT component 712. SMT component 712 passes the incoming request to TransformLib 716 for processing, and that processing is based on the container format. Preferably, TransformLib 716 first rewrites the container-specific incoming URL to an IF (e.g., f-MP4) forward URL. SMT 712 then retrieves the IF fragment on behalf of TransformLib 716. Finally, TransformLib 716 uses the IF fragment to create instructions (BSI), and to serve back any IF requests to the content server ghost 715. TransformLib 716 creates the output object in native format if the instruction set (BSI) approach is disabled. As noted, the local ghost process 714 makes the forward requests (to SMT component 712), and it caches the forward response on local disk. An intermediary caching process may be used between the SMT 712 and local ghost process 714. By using local ghost process 714 in the SMT machine, ghost-to-ghost communications between the content server and the SMT may be used (and optimized).

Figure 8:
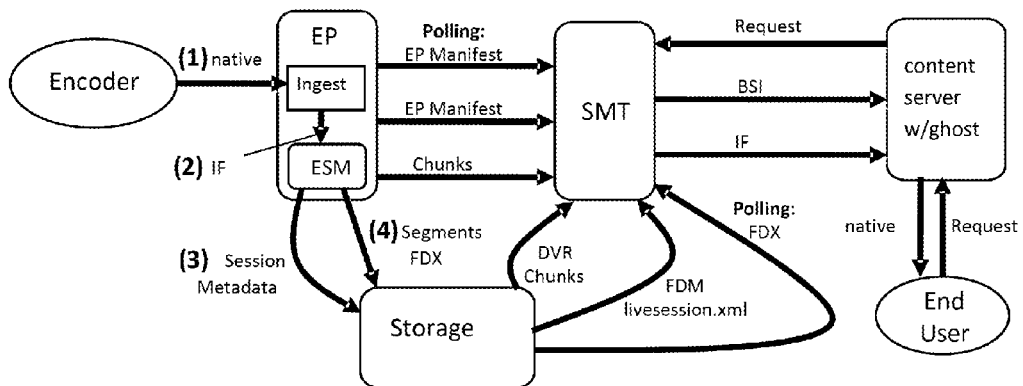
FIG. 8 illustrates an example of a first live streaming workflow used when a stream is published from an encoder to an entrypoint (EP) as described in U.S. application Ser. No. 13/329,057.

FIG. 8 illustrates an embodiment of a first live streaming workflow embodiment that is used when a CDN customer publishes a stream from its encoder to a CDN entry-point (EP).

Figure 9:
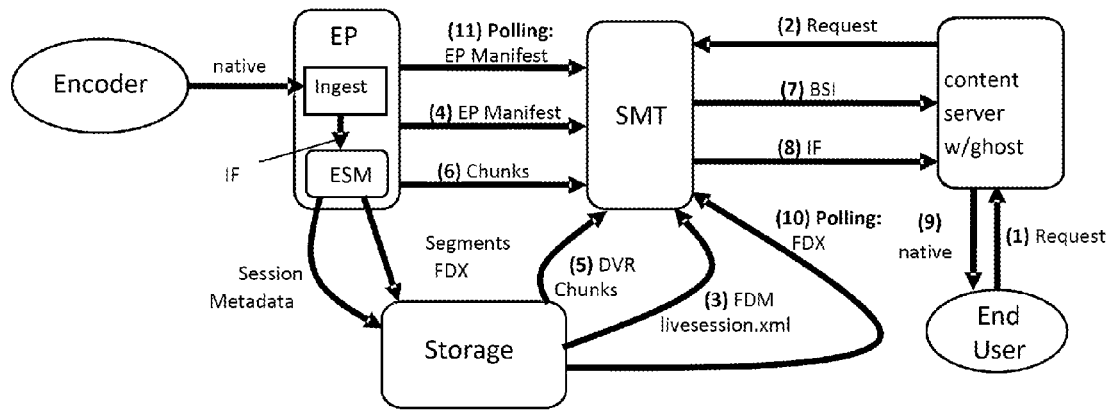
FIG. 9 illustrates an example of a second live streaming workflow used when an end-user makes a live request for content as described in U.S. application Ser. No. 13/329,057.

FIG. 9 illustrates an embodiment of a second live streaming workflow that is used when an end-user makes a live request to a content server.

Referring now to FIG. 8, the encoder publishes a live stream to the EP. The ingest server authenticates the encoder connection, preferably using a streamID to lookup the appropriate stream configuration (Step 1). Ingest server then demuxes the input and pushes the stream to ESM (Step 2). ESM auto-creates a publishing point, preferably uploading to Storage three (3) XML-based files: LiveSession, LSM, and ACF. These per-session metadata files are created at the start of each live stream session (Step 3). The LiveSession file includes live stream information, such as entrypoint IP, sessionID, and streamState. The LSM includes session-specific metadata like bitrates, etc. ACF includes information for use in configuring an archive copy of the live stream. As ESM receives fragments from the ingest server, it aggregates the fragments into segments on the local disk. When the segment size reaches the accumulation threshold, it uploads the segment to Storage. With each segment uploaded to Storage, ESM also uploads an FDX file (Step 4). The FDX (Fragment Index) file is a binary encoded file that provides an index of the fragments that have been uploaded to Storage. This index tells SMT what fragments are in Storage and where to locate them. For fragments that are not in the FDX file, the fragment either is on the EP (because it has not been uploaded to Storage yet) or the fragment does not actually exist. Once the stream is stopped, the LSM and livesession.xml file are updated to change the "streamState" property from "started" to "stopped."

FIG. 9 illustrates an exemplary embodiment of a workflow when an end-user client makes a live streaming request to a ghost process on a content server. The client (e.g., a client media player application) makes a stream request to the content server ghost process (Step 1). This process then makes a forward request to SMT (Step 2). If this is the first request for this live stream to the SMT machine, SMT constructs and caches information about the live stream. To get this information about the live stream, SMT pulls information from Storage for the past DVR fragments and pull information from the EP for the current fragments. SMT makes a request to Storage to get the livesession.xml and LSM file. The LSM file will give information about the live stream and what FDX files to lookup for a particular fragment index range (Step 3). To know what fragments are on the EP, the SMT makes a Manifest request to the EP and the Manifest will list the current set of fragment indexes that reside on the EP (Step 4). Once SMT finds and obtains the requested fragment, it muxes the fragment to the output format. When BSI instructions are used, SMT does not create the actual output object but, instead, SMT creates a BSI instruction response containing the appropriate container format headers and IF fragment request (Step 7). The content server makes a request for the IF fragment, and preferably this request is only for the "mdat" data, which is the video/audio data (Step 8). The content server ghost process then uses the instructions in the response and the IF fragment to construct the output object. It sends the resulting output object back to the end-user as a response to the original request (Step 9). For SMT to know what fragments are in Storage, preferably it continuously polls Storage for a latest version of the FDX file (Step 10). Polling interval for the FDX file typically is a given, potentially configurable time period (Step 10). For SMT to know what fragments are available on the EP, preferably SMT polls the EP for a latest Manifest file (Step 11).

The following section describes preferred URL formats for live, archive and IF requests from a client-player→content server→SMT.

In one embodiment, for live stream requests, the client player URLs have the following format:
http://<domain>/<formatPrefix>/<streamID>/<streamName>/<additionalParams>

Live and Archive URLs preferably have a prefix that denotes that streaming container format and the type of request (e.g., live, archive).

In one embodiment, for archive stream requests, the client-player URLs have the following format:
http://<domain>/<formatPrefix>/<streamID>/<streamName>/<sessionID>/<streamName>/<additionalParams>

The sessionID part of the URL differentiates archives from different live stream sessions. An archive URL gives the location of the archive directory in Storage. The archive URL "format" is simply the path to the default Storage location to which the archive is uploaded. If desired, the archive can be moved to a different Storage directory, in which case the archive path URL is changed to the new Storage directory location. Preferably, the archive URL is immediately available for playback even if the live event is not over yet. The archive URL represents the content that has been archived to Storage so far. For example, if the live stream event has been running for 60 minutes and 58 minutes of the event has been archived to Storage, the archive URL represents a VOD file that is 58 minutes long. As more content is archived to Storage, the archive URL represents a longer and longer VOD file.

An IF URL is constructed by taking the "base URL" of the client request and appending Fragment(<params>) to the end. The "base URL" typically is the portion of the URL that is up to and including the file name. The IF URL parameters are name/value pairs separated by commas and specify bitrate and response types:
http://<domain>/<formatPrefix>/<streamID>/<streamName>.<fileExtension>/Fragment(brt=<bitrate>,idx=<fragmentIndex>,trk=<trackName>,typ=<fragmentType>)

Illustrative parameter tag names include:
brt—Bitrate
idx—Fragment index
trk—Track name (usually audio or video)
typ—Type of response fragment, possible values are: bsi, frg, hdr, dat For the "typ" parameter, if "bsi" is specified, SMT will return a BSI fragment response. (Note that for implementations that involve instruction sets other than BSI, the parameter might be "instr_set_name".) If "frg" is specified, SMT will return the f-MP4 fragment. If "hdr" is specified, SMT will only return f-MP4 headers. If "dat" is specified, SMT will return the mdat box of the f-MP4 fragment. The mdat box is the MP4 box containing the audio/video samples.

In operation, as ESM receives the live stream fragments from the ingest server, ESM writes the data to local disk. For multi-bitrate streams, ESM has a configurable option to either coalesce all bitrates into a single file or have a different file per bitrate. The advantage of coalescing into a single file is that the number of file uploads to Storage is reduced. The disadvantage of a single file is that it is not possible to only retrieve fragments for a single bitrate without also retrieving fragments for other bitrates, thereby making caching less efficient on SMT when a single bitrate is being requested by the end-user. In either case, though, all of the fragments usually are in a single file (be it for one bitrate or many). An ESM trailing window parameter configures how much ESM will save on local disk. Once a segment is outside the trailing window, ESM will delete it from local disk.

If an "Archive to Storage" parameter is enabled, ESM will archive the stream to Storage for DVR or later VOD playback. Typically, ESM stores the last "n" minutes of a live stream. If a customer wants a 4 hour DVR window for their live stream, the customer enables "Archive To Storage" so that fragments older than n minutes are saved in Storage and available for DVR. For certain streams, the customer can disable "Archive To Storage" and the live stream is not uploaded to Storage. In such case, live stream fragment requests are served from the EP. Some customers have 24×7 streams and want say, one (1) day DVR functionality. In that case, the customer enables "Archive To Storage" and enables a 1 day "Archive Trailing Window". By archiving to Storage, DVR requests older than "n" minutes are available from Storage. The "Archive Trailing Window" setting can limit the size of the archive that is stored in Storage. For example, if the "Archive Trailing Window" is set to 1 day, ESM will automatically delete from Storage fragments that are older than 1 day. This is beneficial for the customer because they can have a long DVR window but do not need to worry about cleaning up Storage for their long running live streams.

Figure 10:
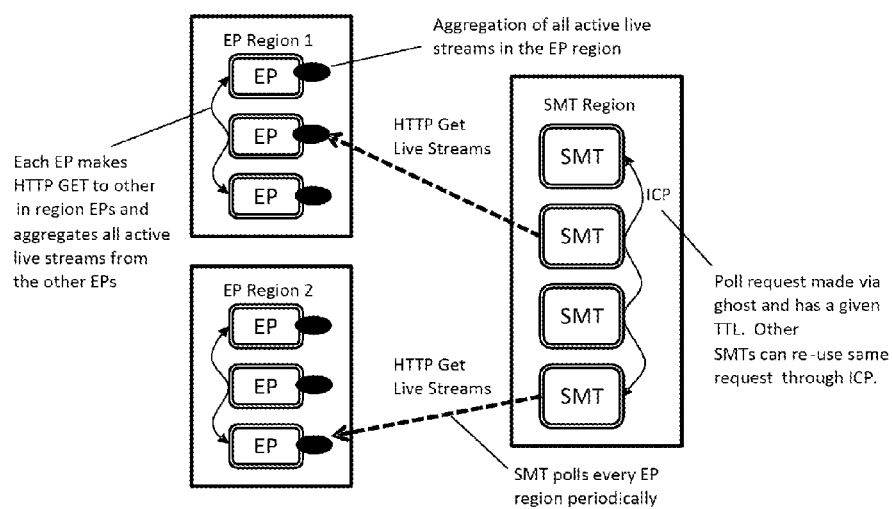
FIG. 10 illustrates an example of a process by which live streams can be announced in the exemplary architectures shown in FIGS. 5, 7, 8 and 9, as described in U.S. application Ser. No. 13/329,057.

SMT can determine all the active live streams through stream "announcements" from ESM. A preferred technique is illustrated in FIG. 10. In this particular implementation, the SMT must know the state of all live streams because the content server ghost process can make a live stream request to any SMT, and SMT needs to know which EP to get the fragments from. If the live stream state is inactive, on the other hand, SMT would know to retrieve the fragments only from Storage (assuming "Archive To Storage" option was enabled).

In the embodiment illustrated in FIG. 10, live stream announcements between SMT and ESM are done using HTTP GET requests from SMT to ESM. To reduce the amount of HTTP requests from SMT to EP, preferably each ESM in an EP region (e.g., EP region 1 or 2, as shown) makes an HTTP request to other EPs in the same region and asks for all live streams on the EP. ESM aggregates together all active live streams from the other EPs in the same region. In this way, SMT only needs to make a HTTP GET request to a single EP machine in an EP region (that is, a set of EP machines) to get information about all active live streams in a region. Second, when SMT makes a request to an EP machine, preferably the request is made via the SMT local ghost process with a given (e.g., 5 second) time-to-live (TTL). Then, when other SMT machines in the SMT region make the same request to the EP region, that request can be potentially served though Inter-Cache Protocol or ICP (that is, a protocol by which other SMTs in the SMT region can respond to the request, if possible, obviating the need to go forward to an EP) because another SMT in the SMT region already made the same request just seconds earlier.

Because the forward request to an EP explicitly would contain the EP IP address, all SMTs in a region should be making an HTTP request to the same EP machine in the EP region to utilize ICP. If the request was not made to same EP machine, the cache key will be different and ICP cannot be used. Therefore, the algorithm to choose the EP machine to query preferably is deterministic and repeatable across all SMTs so that all SMTs will make the forward request to the same EP in the EP region. Preferably, polling from SMT to EP is done every few seconds and is configured through a global server setting. Having a short polling interval minimizes the amount of time between a customer publishing a stream and the SMT knowing the stream exists on the EP. The request logic from SMT to EP handles situations where an EP is down for maintenance or temporarily inaccessible.

As noted above, the live stream archive is stored on Storage for later VOD playback. Any metadata for the live stream session is also stored on the Storage system, preferably in the same location as the live stream archive. If "Archive To Storage" is not enabled, nothing is stored on Storage.

To simplify output muxing to any container format, as noted above, ingested fragments are demuxed into the IF format (Intermediate Format). Once an ingest stream is converted to IF, the muxer can convert from the IF format to any supported streaming container format. This simplifies conversion from any input (source) format to any output (target) format. The PIFF (Protected Interoperable File Format) container format, available from Microsoft, may be used as the basis for the IF container format. PIFF enhances the MPEG-4 Part 12 specification by providing guidelines and UUID extensions for fragmented multi-bitrate HTTP streaming. Besides PIFF, other choices for container formats are Adobe's HTTP Streaming For Flash (Zeri), Apple's MPEG2-TS, or a proprietary format.

Fault Tolerance, Redundancy, and Replication

For stream redundancy and failover, customers may publish a stream to a primary and one or more backup Entry Points. EPs also may support DEEM (Dynamic Entry Point to Encoder Mapping) to provide optimal DNS mapping from encoder to entry point. If an EP were to go down, DEEM can minimize stream downtime by quickly remapping an entry point alias (e.g., via a DNS CNAME) to an EP that is up and running. DEEM functionality includes the ability to resume a live stream session when the EP alias switches from one EP another EP. When an encoder is pushing a stream to one EP and that EP goes down, DEEM remaps the alias, the encoder then starts pushing to the new EP, and the EP "appends" fragments to the previous live stream session. This means the live stream DVR from the previous session is retained and the archive in Storage is uninterrupted.

For EPs to support DEEM, whenever an encoder pushes a stream to the EP, the EP must determine if the stream is a brand new stream or a DEEM failover from a previous live stream session. The EP determines the state of the stream by getting the corresponding livesession.xml from Storage. The livesession.xml contains the "streamState". If the stream is a DEEM failover, the "streamState" will have a "started" value. The EP also does consistency checks, such as query the old EP to determine if the stream actually existed. Consistency checks ensure that the new EP does not unintentionally consider the stream to be a DEEM failover stream when it is not. For the case when a stream is not archived to Storage, the EP simply ingests the live stream without retrieving the livesession.xml from Storage. The SMT does the work of stitching the live stream from different EPs into a single live stream.

The livesession.xml contains the following attributes for DEEM support:
streamState—holds state of the stream
lastRefreshTime—time when the EP last updated the livesession.xml with the current state
discontinuityThreshold—time threshold at which the EP will not resume a previous live stream By default, the "discontinuityThreshold" is set to a given time period, e.g., 30 minutes. This means if an EP goes down and the encoder does not push the stream to the new EP within 30 minutes, the live stream session will not be resumed. The EP checks if the threshold has been exceeded by subtracting the current time against the "lastRefreshTime". If this time difference is more than 30 minutes, the EP will not resume the previous live stream session.

For SMTs to support DEEM, SMT tracks stream states via stream announcements. When the encoder is stopped, a live stream is transitioned to the "stopped" state on the EP. If the EP goes down, the stream does not gracefully transition to the "stopped" state. The SMT tracks ungraceful stream state transitions, and it stitches together live stream sessions if needed. SMT combines DVR fragments from a previous live session and the currently resumed live stream session. From the end-user point of view, the merged live stream sessions is a single live stream session.

Figure 11:
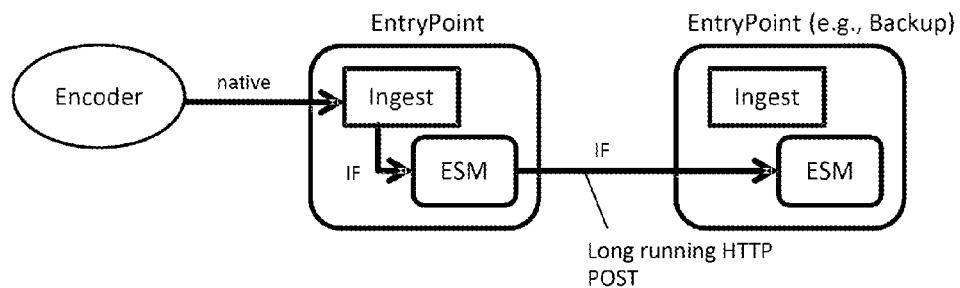
FIG. 11 illustrates an example of a technique for replicating live streams as described in U.S. application Ser. No. 13/329,057.

In certain circumstances, it may be desirable to replicate a single ingest stream to another EP. One possible use case facilitates live stream archive redundancy, which can be used for providing a hot backup of the live stream archive on the backup EP. In this approach, if the primary EP were to go down, the encoder can start pushing the stream to the backup and past DVR is still available because it was auto replicated. Another use case for such replication is live stream redistribution, in which the live stream may be replicated to an EP that is far away (e.g., ingest in United States and replicate to Europe). With the stream replicated to another EP farther away, the content server, SMT, EP, and Storage serving that far away region can be located closer together (all in Europe, for example), reducing the network distance between them. FIG. 11 illustrates one example of a technique. In this embodiment, preferably ESM on the ingest entry point has an option to replicate the stream. The replicated stream is sent either to the backup EP or another EP altogether. Where stream replication is used, the target stream preferably uses a different stream ID than the source stream.

On-Demand Streaming Operation

Figure 12:
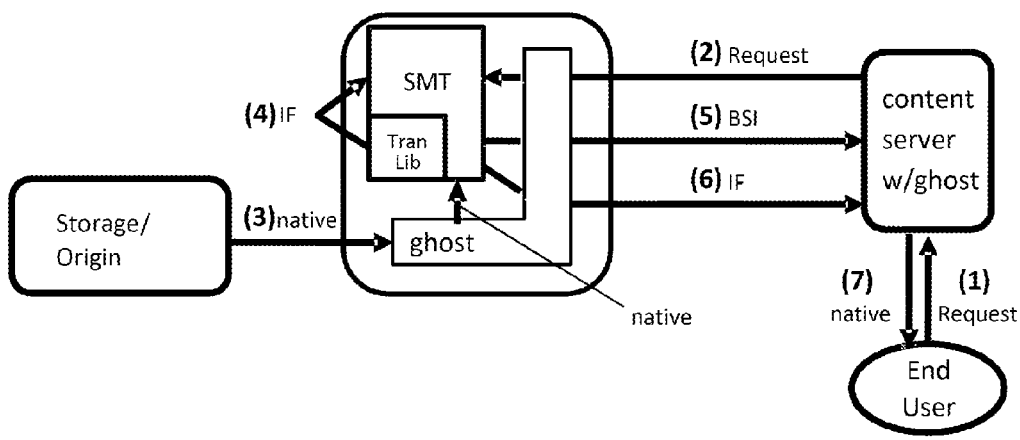
FIG. 12 illustrates an example of an on-demand streaming workflow used when an end-user makes a request for content as described in U.S. application Ser. No. 13/329,057.

Similar to live streaming, and as shown in FIG. 12, in an on-demand embodiment, an SMT component handles on-demand requests from a content server. The same SMT machine can handle both live and on-demand requests.

As shown in FIG. 12, the SMT machine preferably has two primary services: SMT, and local ghost. The SMT service uses TransformLib to process the request URL, and TransformLib constructs the appropriate forward requests to Storage or customer origin. These forward requests are made via the SMT local ghost process and use a cache process as an intermediary between SMT and local ghost. Preferably, the same TransformLib component is used for on-demand and live streaming.

The following details the workflow when an end-user makes an on-demand stream request to the content server. The client player makes a stream request to the content server (Step 1). The content server ghost process makes a forward request to SMT machine (Step 2). If this is the first request to the SMT machine for this on-demand stream, SMT needs to construct and cache information about the on-demand stream. To get this information, SMT first passes the request URL to TransformLib, and TransformLib constructs the appropriate forward requests for the native format file. SMT makes these forward requests to Storage/customer origin via SMT's local ghost process (Step 3). TransformLib takes the forward responses and constructs the response (e.g., BSI) for the requested output format (Step 4). SMT returns the response back to the content server (Step 5). The BSI response contains the container-specific format headers and the request URLs for the IF fragments. Based on the BSI instructions, the content server ghost process makes IF requests to construct the output object (Step 6). The output object is returned to the end-user in the native format (Step 7). As noted above, BSI is optional but can be used to reduce the cache footprint on the content server ghost process. If BSI is not enabled, SMT can return the native output object (i.e., in the target format) to the content server ghost process. The native output object can be cached by the content server just like any HTTP object from an origin server.

For on-demand requests, the client-player URLs may have the following format:
http://<domain>/<formatPrefix>/<forwardpath>/<streamName>

Similar to live and archive URLs, on-demand URLs have a prefix that denotes the streaming container format and type of request (i.e., on-demand).

If BSI functionality is enabled, SMT returns a BSI fragment that consists of the container headers and the IF URLs for the mdat data. For iPhone, e.g., the IF URLs look like the following for audio and video:
http://example.com/iosvod/path/video.mp4/Fragment (brt=512000,idx=5000,trk=video,typ=dat)
http://example.com/iosvod/path/video.mp4/Fragment (brt=64000,idx=5026,trk=audio,typ=dat)

The Fragment(<params>) portion is appended to the "base URL" of the client request (e.g., video.mp4 in the example above). The "base URL" is typically the portion of the URL up to and including the file name but can vary depending on the streaming format.

Figure 13:
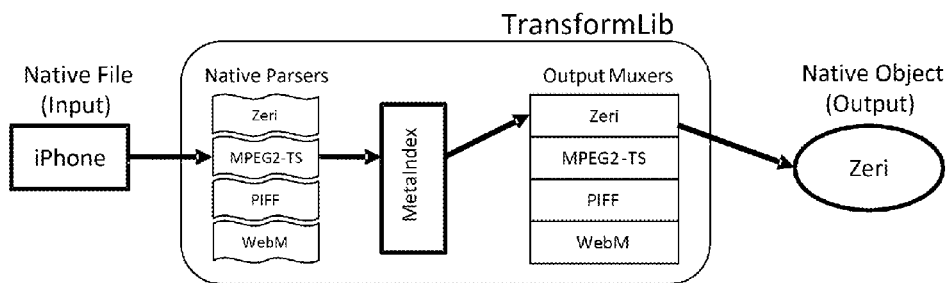
FIG. 13 illustrates an example of the TransformLib component in more detail as described in U.S. application Ser. No. 13/329,057.

For muxing into the desired output format, TransformLib on the SMT contains the logic to demux the native input file and mux into the requested output object. For the request processing workflow, TransformLib first parses the native input file to generate a MetaIndex. The MetaIndex is a generic index that contains information such as composition time, decoding time, IF fragment boundaries, and byte range offsets into the native source file for each IF fragment. The output muxers use the MetaIndex to extract the appropriate bytes from the native source file and use the other information such as composition time to construct the appropriate container headers. The MetaIndex provides a generic interface into the native source files. This interface is an abstraction layer on top of the native source file so that the output muxers do not need to be aware of the underlying container format. A benefit of this design is that if it is desired to support a new input container format, a new native source file parser/demuxer is implemented, but the output muxers remain the same. Similarly, if it is desired to support a new output container format, a new muxer is implemented but input demuxers remain the same. FIG. 13 illustrates this abstraction layer. If desired, the MetaIndex may be cached within SMT's local ghost process cache for later reuse or for use by an ICP peer. Creating the MetaIndex can take time, and caching on the local ghost process decreases the response time for the first VOD fragment request. To support local ghost process caching, SMT makes a local host request via ghost for "/metaIndex". The loopback request is handled by the local SMT, and its response is cached by the ghost process. Other SMTs in the region also get the benefit of using this MetaIndex because it is available via ICP.

The above-described architectures (for live or on-demand) is extensible to support any streaming format. The following section describes how to support a new streaming container format.

Figure 14:
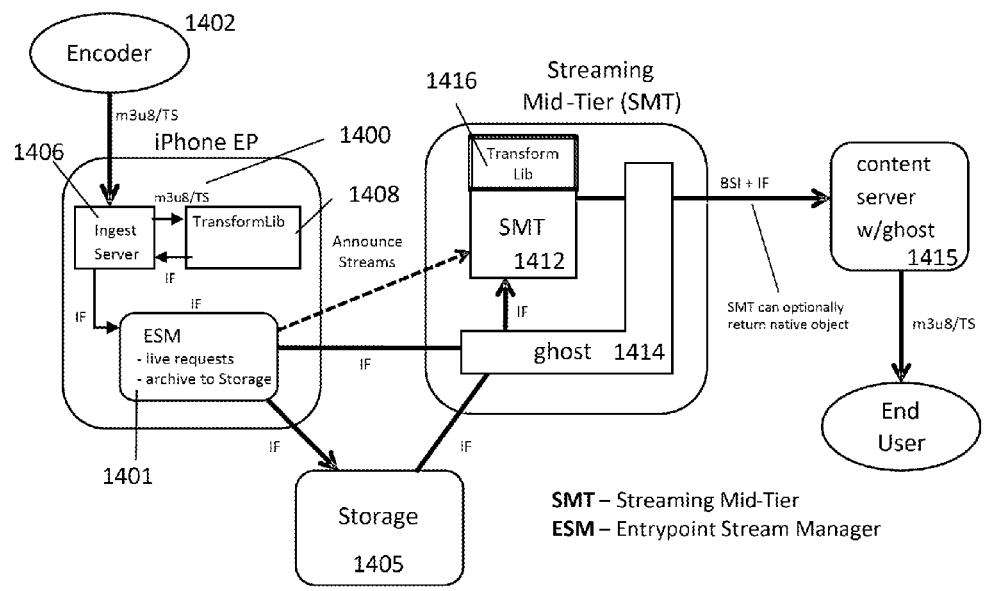
FIG. 14 illustrates an example of a workflow supporting ingestion and output of a content stream in a given format as described in U.S. application Ser. No. 13/329,057.

FIG. 14 illustrates one exemplary embodiment of a technique for supporting ingestion of iPhone content and output of iPhone content. In this embodiment, an iPhone EP 1400 ingests an Apple-Segmented MPEG2-TS stream, and TransformLib 1408 supports MPEG2TS for demuxing and muxing MPEG2-TS. TransformLib 1408 parses iPhone URLs and rewrites them to the forward path. On the EP 1400, the iPhone ingest server 1406 handles HTTP POST/PUT requests from the encoder 1402. The iPhone ingest server passes the TS segments to TransformLib 1408 for demuxing into IF (e.g., f-MP4) format. The iPhone ingest server then sends the IF fragments to the local ESM 1401. The ESM archives the stream to Storage and announces the live stream to the SMTs, as described above. On the SMT 1412, the TransformLib 1416 processes iPhone request URLs for m3u8 and MPEG2-TS. TransformLib 1416 constructs the BSI response and returns it to the content server 1415. For MPEG2-TS segments, data packets are interleaved with container headers every 188 bytes. This means that for every 188 bytes of audio/video, there will be some container headers. Preferably, the BSI syntax supports loop constructs to reduce the complexity of the BSI response and still generate the appropriate MPEG2-TS segment. Using BSI to mux the object on the content server is optional. SMT 1412 can also return native MPEG2-TS segments back to the content server 1415 if BSI is disabled.

Figure 15:
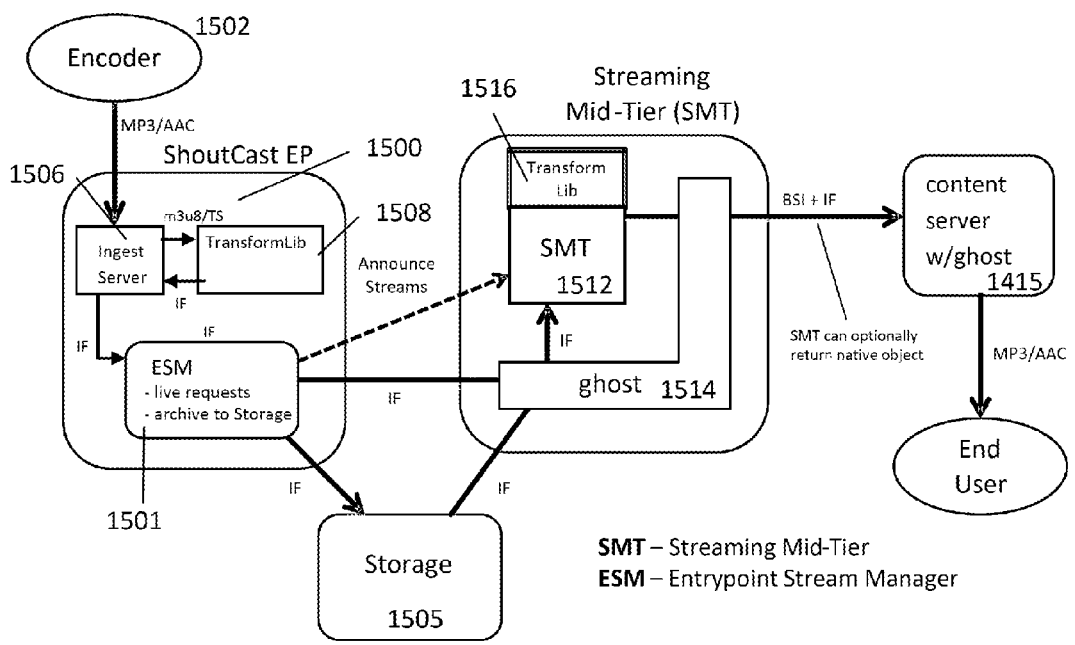
FIG. 15 illustrates an example of a workflow for supporting ingestion and output of a content stream in another given format as described in U.S. application Ser. No. 13/329,057.

FIG. 15 illustrates an embodiment for supporting the Shoutcast format. Shoutcast is a protocol that is primarily used for audio live streaming over HTTP-like connections. To play a Shoutcast stream, the client makes an HTTP request and the HTTP response body is a continuous audio stream (i.e., unbounded response body). The audio stream is a mix of MP3 data (or AAC/OGG) and Shoutcast metadata. Shoutcast metadata typically contains song titles or artist info. While the Shoutcast protocol is similar to HTTP, it is not true HTTP because the protocol includes some non-standard HTTP request and response headers. As illustrated in FIG. 15, this embodiment comprises a Shoutcast EP 1500 to ingest Shoutcast-encoded streams. The TranformLib 1508 for Shoutcast library is provided to demux and mux MP3/AAC/OGG. TransformLib 1508 also parses Shoutcast URLs, rewrites them to the forward path, and generates BSI instructions. Because the client-player downloads a continuous unbounded HTTP response, the content server ghost process 1415 must turn fragmented forward origin requests into a single continuous client download. BSI instructs the ghost process on how to construct the client response from fragmented responses to forward requests. As shown in FIG. 15, the network architecture for Shoutcast support is similar to the iPhone support as provided in FIG. 14. The Shoutcast EP 1500 ingests the stream. The ingest server demuxes the stream using TransformLib 1508. It then sends the stream to ESM 1501. The ESM and SMT components remain the same. TransformLib 1515 on SMT 1512 parses Shoutcast URLs, creates BSI responses for Shoutcast, and muxes into Shoutcast output format.

Further details on live and on-demand streaming architectures may be found in aforementioned U.S. patent application Ser. No. 13/329,057, the teachings of which are hereby incorporated by reference.

Binary Side Includes (BSI)

As described in U.S. patent application Ser. No. 13/329,081, filed Dec. 16, 2011 (now published as U.S. Patent Publication No. 2012/0259942 and as WIPO Publication No. WO/2012/083296), the teachings of which are hereby incorporated by reference, BSI is a name for functionality executable in a content server to generate output objects given an input object and certain instructions, typically instructions from another component such as the SMT component described above. The instructions typically define manipulations or actions to be performed on the input data. Such functionality is intended to enable modification of payloads as they are served to a requesting client, allowing a content server to easily provide, among other things, custom or semi-custom content given a generic object. In a typical but non-limiting embodiment, this functionality can be built into the HTTP proxy (ghost) application on the content server, although in alternative embodiments it can be implemented external to ghost.

Typically, many modifications made by the content server result in a minimal overall change to content, meaning that the resulting data served to the requesting client differs from the input by, for example, only a few percent. In one embodiment, a mechanism is defined for representing the difference (or "diff") between the source(s) and output content, allowing a generic feature in the content server to handle an increasing number of streaming formats in an efficient way.

In general, with BSI, components other than the content server are made responsible for defining or generating transforming logic and for providing instructions—along with binary "diff" information—that can be understood by the content server. By providing a mechanism for representing the difference (or "diff") between the source(s) and output content, and providing the content server with a way to use these to modify a generic source object, the client-facing content server may handle an increasing number of requests efficiently. Furthermore, depending on the circumstances, the inputs (e.g., the generic source object, instructions, etc.) may be cached. The output of the process also may be cached in some cases.

As noted previously, for convenience of illustration, in this disclosure this function is called BSI, for Binary-edge-Side Includes, or Binary Server Integration. The BSI language, with proposed syntax described below, defines different sources—incoming pieces of data that help construct the final output. Instructions (like 'combine' and others) define the byte ranges and order of how to merge these inputs, as well as controlling output headers. When generated in real-time, the BSI fragment and source object both can be cached (e.g., at the content server), placing far less load on the BSI generation tier than the content server would have handling them directly. For fixed/on-demand applications, the BSI may be generated once, and a BSI fragment cached (e.g., either on the content server, or on network storage or other dedicated storage subsystem such as is shown in FIGS. 5-6).

The BSI approach is ideally very fast. Preferably, the syntax is XML-based, and the number of instructions typically is kept very low, allowing fast parsing. The execution of BSI instructs the content server what order, and from which source, to fill an output buffer that is served to the client.

In the context of the previously-described streaming platforms, BSI functionality can be used between the SMT and content server to streamline the creation of an output object (e.g., an output object representing the stream in a native format for iPhone or other client device) from an input source (in the above cases, the IF fragments). The SMT receives IF fragments and performs muxing steps. Instead of muxed content as output, the SMT creates a dynamic BSI fragment that can be served to the content server, along with a binary object that contains the additional bits that the content server needs to combine with the IF fragment it normally receives. The content server uses this information to create the muxed output object in the native format, representing all or some portion of the stream.

Figure 16:
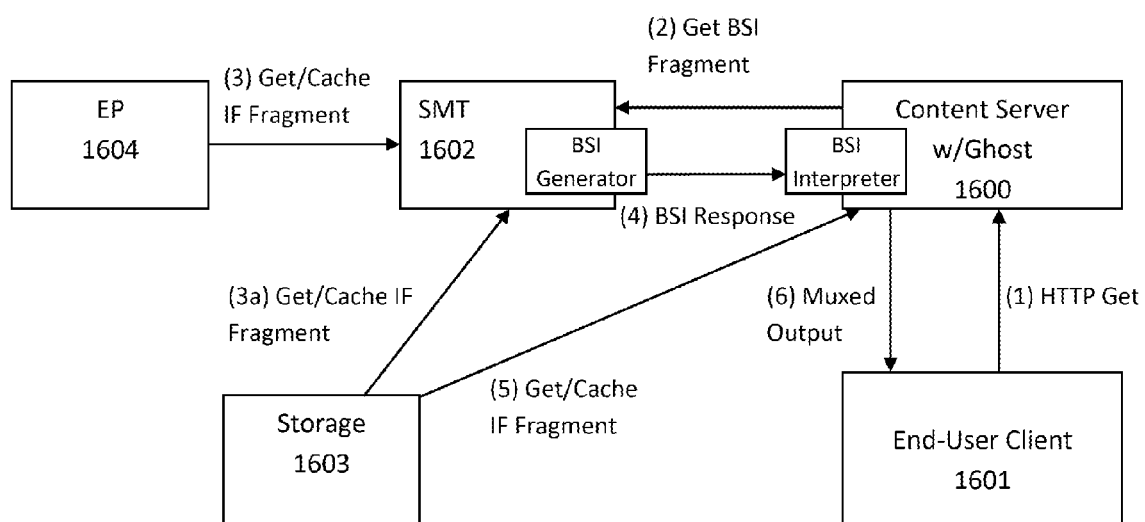
FIG. 16 illustrates an example of a workflow using binary-side-includes (BSI) to facilitate streaming as described in U.S. application Ser. No. 13/329,081.

Examples of using BSI for streaming are illustrated in previous FIGS., but FIG. 16 shows an embodiment of a workflow with additional detail. In this illustrative embodiment, the content server ghost process 1600 receives a request from a client player 1601 for particular content (step 1) in certain target format. The content server makes a request to a muxing tier (the SMT 1602) for the BSI instructions required (step 2). Typically, the request includes parameters via query string, to specify the type of request (manifest, content, key file, etc), the bitrate requested, a time determination (fragment no, time offset, etc.), and other parameters related to muxing (segment duration, A/V types, etc.). The SMT 1602 obtains the relevant IF fragments from the EP 1604 (step 3) or Storage 1603 (step 3a), builds an appropriate output object from the IF fragments as if it were to serve the content, creates a buffer of the bytes needed beyond what was contained in the IF fragments, along with instructions about how to 'interleave' or combine the binary diff with the IF. In some implementations, it should be understood, any necessary diff data may be embedded directly in the instructions themselves. In step 4, the SMT 1602 then sends the BSI response to the content server. The response may also include a reference to the IF fragments that are needed. The content server gets the IF fragments in any of variety of ways, including from the SMT (that is, in addition to the BSI), from its own cache, or from Storage 1603, which is typically a network storage subsystem that was previously described in connection with the streaming platform. Purely by way of example, step 5 in FIG. 16 shows the IF fragments arriving from Storage and being cached.

As the vast bulk of the data, which is represented by the IF fragment, is cached at the content server, the BSI response with its binary diff typically might be around a few percent of the overall size of the object to be served. The content server ghost 1600 applies the BSI, generating and serving a muxed output object to the client (step 6). The BSI response, including both the instructions and the diff data, can be cached by the content server ghost 1600 for some period of time. Preferably, the parameters supplied in the request to the SMT (step 2) are used in the cache key so that only subsequent requests for content with the same parameters utilize the cached BSI response. The output of the BSI operation need not be cached.

The foregoing approach can provide a variety of advantages. Because the BSI instructions can be used tell the content server ghost process how to mux or otherwise create the output object, BSI provides a way for the process to support any streaming container format without needing associated code changes at the content server ghost process. To handle new container formats or bug fixes to support existing container formats, BSI instructions can change, but the content server ghost process logic remains the same. This eliminates any cross-component dependency with the content server or its ghost process when developing or implementing new streaming features.

Further, for streaming to client devices using different container formats, BSI can reduce the ghost cache footprint size because the ghost process caches the IF fragments but muxes the IF into different native formats. Preferably, the muxed output is not cached; rather, only the IF fragment is cached. For example, the system can be used to stream Adobe Zeri (HTTP Streaming for Flash) to Android devices running Flash 10.1 and stream to MPEG2-TS to iPhone devices. For the live stream, only the IF fragment is cached and the content server muxes into Zeri for Android devices and muxes into MPEG2-TS for IPhone devices. These are just representative examples.

For streaming of progressive-download-style formats (like Shoutcast), data is streamed to client as a long-running unbound HTTP download. From the end user client perspective, it is downloading a file that never ends. BSI functionality can be used for progressive-download-style formats and, in particular, to mux fragment responses from the origin (e.g., a content provider origin or CDN storage subsystem) into a continuous HTTP download stream for the client. Using metadata applied by the content server ghost process (configurable by content provider) and progressive-download-style BSI from the SMT, BSI can also be used to implement progressive-download-specific features, like jump-to-live-on-drift and delayed metadata injection based on user-agent. Specific progressive-download-style requirements thus can be inherently supported through BSI without requiring any changes in the content server.

Fragmented streaming formats (like Zeri, iPhone, and Silverlight) may also use BSI functionality. For example, the SMT can send the content server content in a native format or a BSI fragment that the content server ghost process muxes into the native format. If a CDN content provider customer is only doing streaming for a single container format, there is no need to cache IF fragments and mux on the content server ghost process via BSI. In such case, it is more efficient for SMT to return the native object, which the content server ghost process caches. Enabling or disabling using BSI is configurable, preferably on a content provider by content provider basis, and, for a given content provider, on a site by site basis, or even a file by file basis.

More details and examples of BSI can be found in aforementioned U.S. patent application Ser. No. 13/329,057.

Transcoding System

The content delivery network (CDN) described above provides an advantageous and feature-rich platform for streaming and object delivery. However, the CDN platform may be enhanced yet further by integrating into it a distributed, scalable transcoding system that provides the ability to transform content such as audio, video and other files, which may then be delivered to end-users over the platform. Typical transcoding tasks include the conversion of media from one bitrate/resolution to another for the purposes of adding bitrates to a multi-bitrate stream, converting from one container format to another or one encoding format to another in order to allow clients utilizing such formats to play the content. These tasks may be part of prepping media for ingestion into the streaming platform described above.

In one embodiment, the distributed transcoding system described herein leverages the resources of the aforementioned content delivery architecture to perform certain processing tasks within the CDN, as real-time or background (batch mode) processes. Thus, for example, the CDN may prepare and transcode certain content in preparation for delivery, even while other content (from the same or other content provider users of the system) is being delivered. In other words, the machines described above that provide content delivery services (streaming, object delivery, or otherwise) may be leveraged, in accordance with the teachings hereof, to perform transcoding tasks. More particularly, the transcoding system may be implemented not only with a set of purpose-built hardware, specific to the transcoding task, but also supplemented with the available idle or low-usage resources of the content delivery network that was previously described, to achieve a highly scalable and flexible solution. For example, the resources of the various distributed CDN content servers (including in particular the HTTP proxy servers, aka ghost servers, described above), among others, may be leveraged in this way. Exemplary implementation details will set forth in more detail below.

It should be noted that the subject matter herein is not limited to a transcoding system implemented in conjunction within a CDN, although that is one useful implementation. For example, the distributed transcoding techniques described herein may be implemented in a standalone system with dedicated machines, entirely separate from other content delivery services or machines.

As mentioned previously, in one embodiment, the transcoding system can process files either in batch or real-time modes. Both kinds of jobs may be running within the platform at any given point of time. Preferably every transcode that runs in the system is happening as fast as possible given its priority and the available resources. The transcoding system itself is generally incognizant to the type of job it is processing—it simply processes requests with a given priority. In this way the system can be used for both batch and real-time transcoding of on-demand or live content.

For convenience of illustration, the exemplary transcoding system described herein makes use of the following concepts:

Fluxer. Generally speaking, in this embodiment, the Fluxer is the primary interface of the transcoding system. It is responsible for breaking up files, managing the transcoding process across many individual sub-transcoders, putting the file back together and sending it to the destination.

Transcoding job. A job refers to a request to transcode an entire file (e.g., a particular audio, video, multimedia file, or otherwise) as opposed to an individual "task" which refers to the transcode of a single segment of the file. A "job" is also called a "Fluxer Job" and is made up of many transcoding "tasks".

I-frame/keyframe. I-frame refers to a video frame that contains enough data to reconstruct the frame on its own (also known as a keyframe.)

P-frame. P-frame refers is a video frame that contains information relative to a frame in the past of the data stream.

B-frame. A B-frame refers to a video frame that may contain information relative to a frame that exists either in the past or in the future of the data stream.

GoP. GoP stands for Group of Pictures and refers to a keyframe (I-frame) and all subsequent P and B frames which reference that keyframe until the next keyframe.

Closed GoP. When no P or B frames within a GoP reference frames from any other GoP, the GoP is said to be a Closed GoP.

Open GoP. Since B frames may reference frames both before and after itself, it is possible for a B frame to reference the keyframe of the next GoP. When frames from another GoP are referenced, the GoP is said to be an Open GoP. Therefore Open GoPs generally require at least a portion of the next GoP is needed in order to fully decode the Open GoP.

Figure 17:
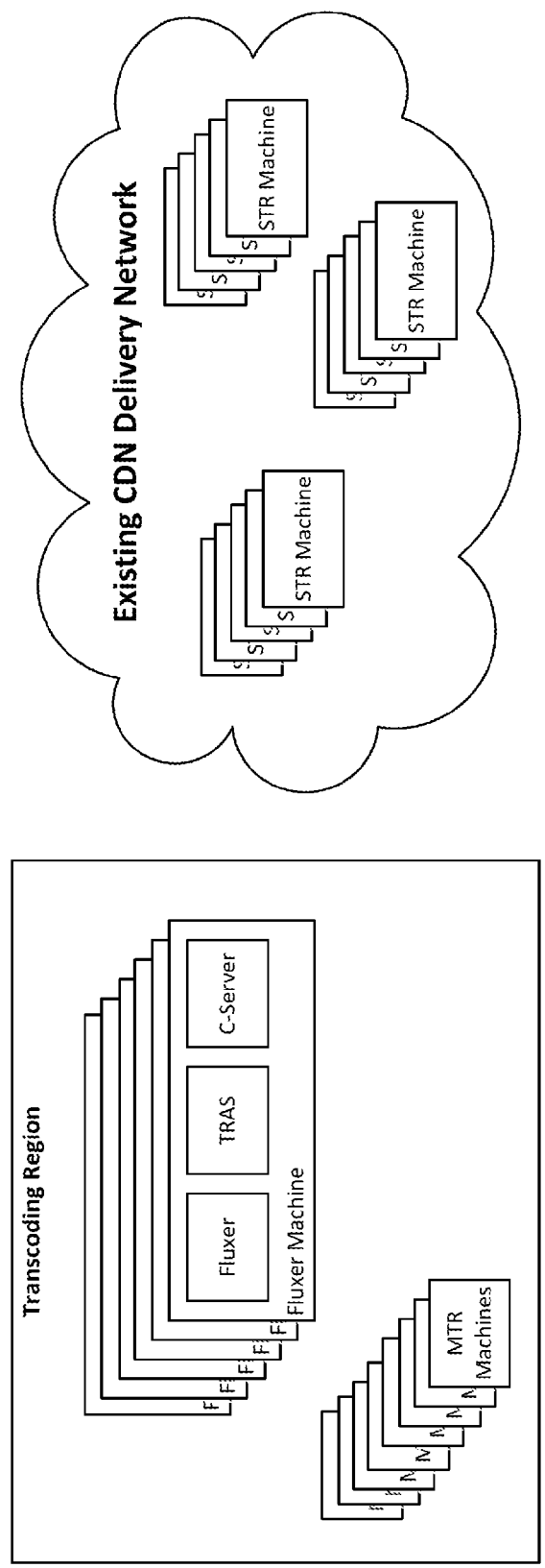
FIG. 17 is a block diagram of one embodiment of a transcoding platform that includes a transcoding region with certain machines, as well as an existing content delivery network with machines that are leveraged to provide transcoding resources.

Referring to FIG. 17, in one embodiment, a transcoding system includes several components some of which are in a dedicated transcoding region and others of which are from the network of CDN servers. A region in this sense typically refers to a machine or set of machines in a particular network location, which may or may not be co-located with a region in the content delivery network. The transcoder region typically includes fluxer machines running a Fluxer (a fluxer process), transcoding resource access server application (TRAS), and a coordination server (C-server), as well as a set of managed transcoding resources (MTRs), e.g., a managed transcoder machine running a transcoding process. FIG. 17 shows the fluxer machines and MTRs in a single region, but the actual network location/topology of the transcoding region components is flexible and this example should not viewed as limiting. For example, one implementation many include many transcoding regions with one or more fluxer machines and one or more MTRs may be distributed throughout various networks, and even co-located in the content delivery regions with content servers shown in FIG. 17.

The CDN content servers represent shared transcoding resources (STRs) to the transcoding system, as they are shared with the delivery and other CDN functions (e.g., security, content adaptation, authentication/authorization processes, reporting functions and so on). More broadly, the STRs are idle or low-utilization resources across the CDN that have transcoding capabilities and can be called upon to serve the transcoding system with their raw processing capabilities. Since these are typically idle or low-utilization servers, their main value is their processor (CPU). They are not expected to contain specialized hardware, nor can they be expected to be as reliable or available as MTRs, although they may exist in greater numbers. Prime examples of potential STRs are the HTTP proxy servers (e.g., also known as ghost servers or edge servers) described previously in conjunction with FIGS. 1-16. However, any of the machines shown in FIGS. 1-16 are candidates for use as STRs provided they can be modified in accordance with the teachings below to become part of the transcoding system.

Turning to the operation of the transcoding system, in general, the Fluxer is responsible for breaking apart media files into transcodable segments and sending those segments off to transcoding resources to be transcoded in parallel. Preferably the segments are coded so that the amount of data sent around the network is reduced. The transcoding resources can then decode and re-encode to accomplish the requested transcode. The Fluxer uses the TRAS to get lists of available transcoding resources and reports its status to the C-server. The transcoding resources (TRs, which may be either MTRs or STRs) are responsible for transcoding individual media segments and sending the derivatives back to the Fluxer to be remuxed back into a transcoded media file. MTRs, which are dedicated resources, report their status to C-Server. The TRAS can be implemented as a library that is responsible for encapsulating TR selection to an interface for consumption by the Fluxer. The TRAS uses a combination of awareness of local transcoders from C-server as well as requests to a Mapper (e.g. the map-maker and DNS system shown in FIG. 1) to identify idle HTTP proxy servers or other CDN servers. The C-server tracks liveness from local TRs and Fluxers and acts as a local messaging platform for all transcoding servers in a region.

Figure 18:
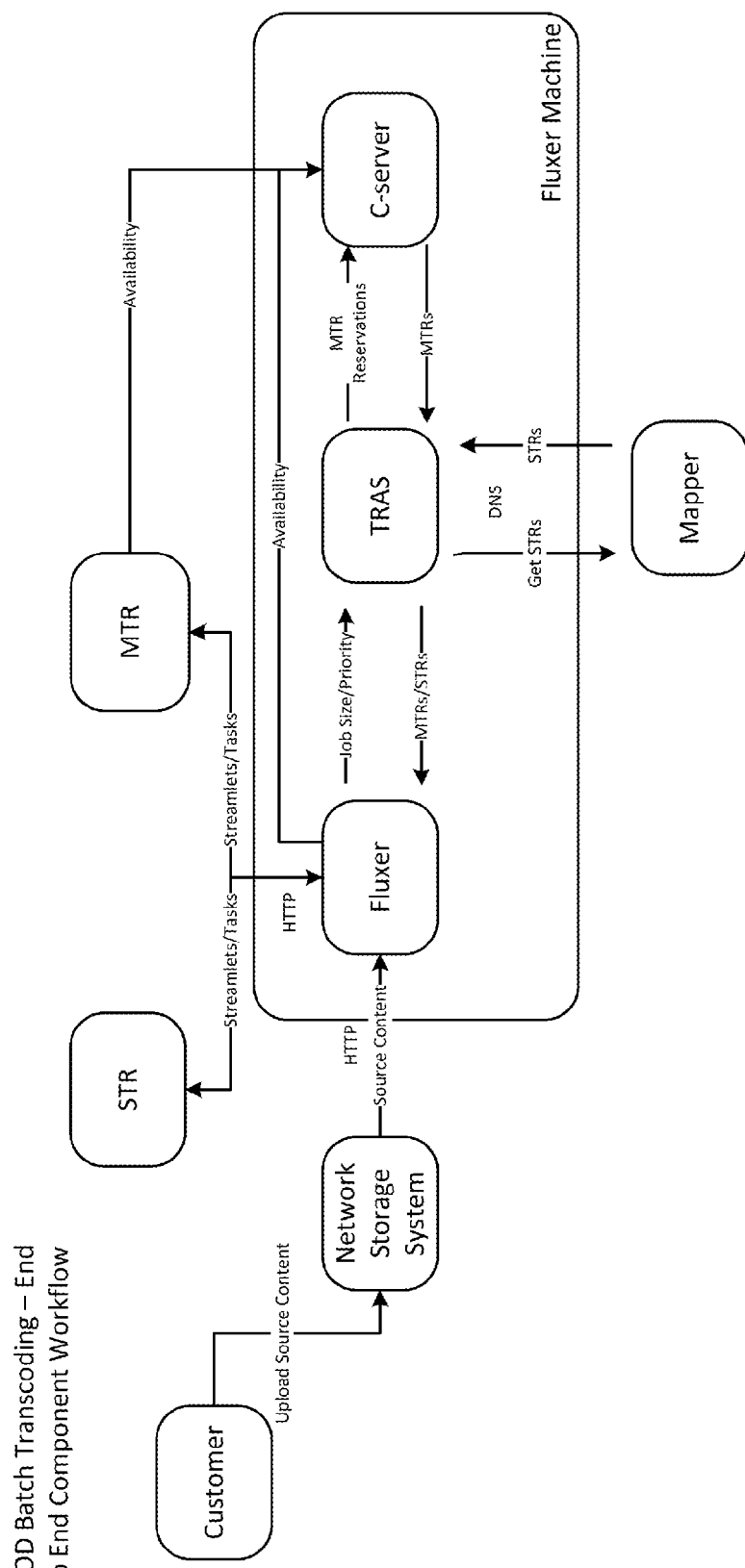
FIG. 18 illustrates an example of a workflow for video-on-demand batch transcoding in accordance with the teachings hereof.
Figure 19:
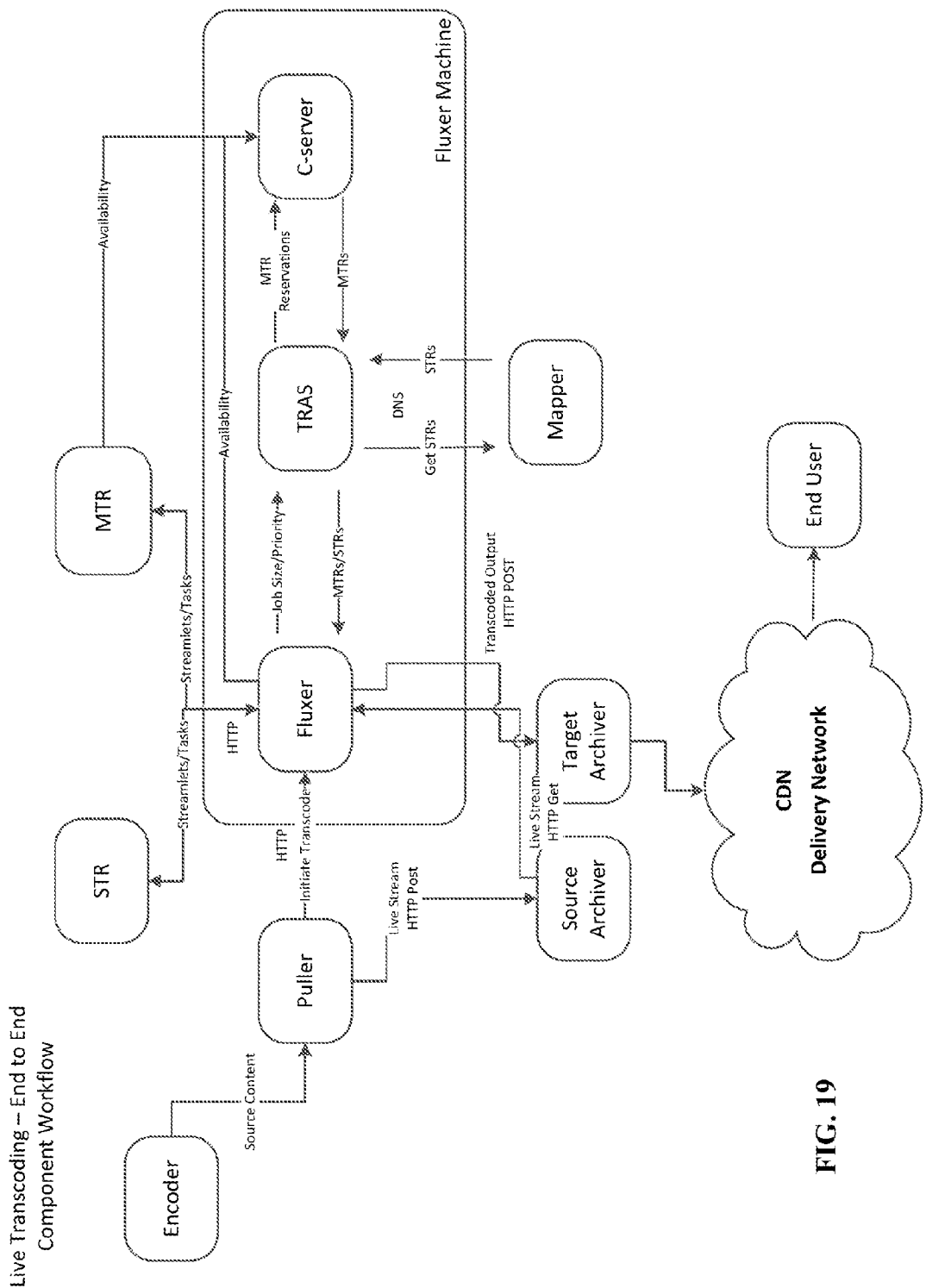
FIG. 19 illustrates an example of a workflow for live transcoding in accordance with the teachings hereof.

FIGS. 18 and 19 illustrate the general function of and communication amongst components for particular embodiments of video-on-demand (VOD) transcoding and live transcoding, respectively. The Fluxer receives files to transcode or responds to transcode-initiation requests for VOD and live streams. A variety of components are potential sources for requesting batch or live transcoding jobs. Examples of such components include, for example, a storage system (as shown, for example, in FIGS. 3, 5-7, and including network-based storage), a content provider user interface (e.g., a web-based portal providing a customer with a user interface to the CDN for configuring, uploading content to transcode, setting transcoding parameters, and monitoring the operation), or an Entry Point or Puller or other component in the streaming architecture (as shown, for example, in FIGS. 3, 5-7), or a CDN server 102 that has received a request from an end-user client.

In one implementation, the Map-Maker and DNS system shown in connection with FIG. 1 (the "Mapper") can be leveraged to find the closest and best available Fluxer, as the map-maker monitoring agents and the data collection system 108 are already monitoring network conditions and machine usage for the content delivery network. The requesting component makes a DNS request to a Fluxer domain and receives back the IP address of a particular Fluxer machine available for connection. The requestor can use a shared secret to authenticate to the Fluxer. Once a job begins, the Fluxer contacts the TRAS to request a list of servers to use for transcoding, and preferably provides the TRAS with as many specifics about the job as possible, including the approximate size of the input source, and whether the job is classified as real-time or batch or otherwise, which effectively classifies the priority of the job, and potentially specifics about the input/output formats, desired bitrates, etc. The TRAS uses this information to approximate how many transcoding resources it will need, and what mix of MTRs and STRs will be the most appropriate. As noted above, MTRs are dedicated transcoding resources that are managed by the transcoding system, while STRs are transcoding resources which are shared with content delivery resources (or shared with some other business function in the platform). To select MTRs, the TRAS can uses a resource management service referred to here as the coordination server (C-server). The TRAS uses the C-server to reserve local MTRs, while it asks the map-maker system (FIG. 1) for any needed STR. The Mapper will identify an approximate number of CDN servers from a pool that are running with a low utilization (e.g., with CPU or memory or request rate or other hardware metrics below some predetermined threshold, which ideally ensures that content delivery is not compromised) and return a list to TRAS. The TRAS merges the lists, preferring MTRs for real-time jobs and STRs for batch jobs, and returns the final list to the Fluxer.

Once the Fluxer has obtained a list of available transcoding resources it begins splitting the input source file into a plurality of segments. Although not limiting, in many cases the input file is not raw, uncompressed data but a somewhat compressed file arriving from a customer that is too big to serve to requesting clients, but is suitable for transcoding (for example, a 50 MB/s video may be suitable, depending on the nature of the content and the encoding used). The input file may also be a previously encoded/compressed file that is now being transcoded to another format or bitrate.

The Fluxer splits the file into segments for transcoding purposes. The transcoding segments may correspond to group-of-picture (GoP) boundaries, in which case they are referred to herein as chunks. Alternatively, the transcoding segments are split along other boundaries into pseudo-chunks, as will be described in more detail below. A transcoding segment refers to the actual bits being transcoded, i.e., the bits involved in the input and output, and does not necessarily correspond to a single chunk or pseudo-chunk, as it may contain multiple chunks or pseudo-chunks. Pseudo-chunks may overlap in time, i.e., they do not necessarily represent contiguous portions of the overall input file. The process of determining how to split the file into transcoding segments can involve many determinations and is explained later in more detail in the section titled "Creating Transcoding Segments From an Input".

The Fluxer sends the transcoding segments to selected transcoding resources along with a list of ways in which that segment should be transcoded. Note that this means that the list may specify more than one output—for example, "transcode the segment into a derivative segment in format/bitrate 1, and another derivative segment in format/bitrate 2." As each transcoding resource transcodes its given segment, it replies over the open HTTP connection with the derivative segments produced from the input source. If a transcoding resource cannot complete the transcode due to some unforeseen circumstance, it simply tears down the connection and goes away, leaving the Fluxer to source another transcoding resource for that segment. Once all of the segments have been transcoded, the Fluxer re-assembles them into a single file and sends the file to the destination specified by the initial request.

The destination of the file may be, for example, a network storage system, a streaming mid-tier machine (e.g., as shown in the architectures of FIGS. 5-7 for example), proxy server, or other component in the CDN. Unless the target format produced by the transcoding system was intermediate format (IF), the destination component may then convert the file to IF for use with the streaming platform described previously, for shipping the data within the streaming architecture.

With reference to FIG. 19, when transcoding a live stream, there are some variations over the VOD batch workflow described above. First, in this embodiment, when transcoding is initiated, it is initiated by the Puller component in response to the presence of a set of transcoding profiles in the Stream Manifest Manager (SMM) for that live stream. SMM already carries the concept of an Archiver set, and here includes the concept of a Fluxer Set. The Puller contacts one of the Fluxer Machines in the Fluxer Set with the parameters of the live event and the Fluxer set begins an election process to decide who is the most appropriate Fluxer Machine to act as the Mother (the remaining Fluxers will be designated as Children). The Mother begins transcoding by pulling the stream from the source Archiver, transcoding using transcoding resources as described above, and pushing it to the target Archiver. Children are responsible for monitoring the Mother and electing a new Mother in the event of a failure. (For simplicity of illustration, in FIG. 19 only the Fluxer that is acting as the Mother is shown.)

It is important to note that FIG. 19 illustrates and the foregoing describes operation of the transcoding system with the streaming architecture shown in FIG. 3. However, in an alternate embodiment, the transcoding system works in conjunction with the streaming architecture illustrated in FIGS. 5-15. This means that the Fluxer can receive a request to transcode and source content from an entry-point (EP) stream manager process and sends transcoded output to an SMT machine, rather than a Target Archiver. Indeed, as mentioned above, the transcoding system is not limited to use with any particular streaming architecture, or with a streaming architecture at all (i.e., it can be a standalone transcoding service).

The following sections provide more detail about the each of the individual components that make up the transcoding system.

Coordination Server (C-Server)

In the above-described embodiment, the C-server is a coordination engine for a given transcoding region that provides a service for maintaining configuration information, naming, providing synchronization and group services to distributed applications. C-server functionality may be built on top of existing, known platforms such as Zookeeper (Apache Hadoop) for example, although this should not be viewed as limiting or required. Preferably, the C-server provides a job-queue and tracks which resources are working on those jobs, and also maintains resiliency when those servers fail. In the above-described embodiment, the C-server is region specific and runs on all Fluxers in a region using an internal election algorithm to determine the leader for write coordination to the C-server system. The C-server can report its region and status to a supervisory query function so that alerts can be triggered for a low number of C-servers running in a region, mitigating availability issues.

Transcoding Resource Access Server (TRAS)

The TRAS provides an application programming interface (API) for obtaining a set of possible transcoders that can be called directly by the Fluxer to perform transcoding of segments. Since there are multiple types of transcoding resources available (MTR/STR) and since the method of accessing them may differ, TRAS provides an abstraction for access to both of these resources through a common interface. TRAS can be implemented as a built-in library to be consumed by the Fluxer. This means that it is run as part of the Fluxer process. TRAS allows for distinct types of transcoder requests, for example: high-priority (typically real-time needs for live transcodes, which may necessitate using only MTRs) and low-priority (typically batch needs, which may involve a mix of MTRs and STRs). TRAS returns a list of possible resources for use as transcoders to Fluxer. Both high-priority and low-priority requests typically specify a bucket-size, which TRAS will attempt to fill. The response to Fluxer is a data structure that includes the transcoding resource's IP address and type. The transcoding resources themselves are considered volatile and TRAS provides no guarantees that the resources will accept a transcoding request.

Determination of STR availability is delegated to Mapper in this embodiment. During normal CDN operation, CDN server utilizations are reported back to Mapper as part of monitoring agents and the data collection system 108 in FIG. 1. When STR resources are requested, a DNS request will be sent to Mapper to retrieve a set of STRs. Mapper identifies a pool of available CDN servers which are mostly idle (e.g., as defined by some metric such as CPU utilization in the recent past, cache utilization, geographic location relative to expected load—in other words, servers that are located in regions where demand for delivery services is low due to time of day or some other reasons, etc.), pseudo-randomize the selection and will return the maximum number of available IP addresses that can fit in a response packet. TRAS may perform this request more than once to fill the internal bucket requested by the Fluxer.

In this implementation, it is up to the TRAS to de-duplicate the IP addresses retrieved from Mapper if it performs the DNS request more than once. Mapper is not required to maintain state of IP addresses returned. If the Fluxer requests additional resources from TRAS, then the Fluxer is required to de-duplicate the IP addresses retrieved from TRAS, as TRAS is not required to maintain state of IP addresses returned to Fluxer.

When TRAS receives a request that uses at least some MTRs (for example, a live-event transcode), it will use C-server's coordination capabilities to "reserve" a number of MTRs as requested by the Fluxer. TRAS provides its service through a combined, parallel query to both Mapper and C-server. As noted, it gathers enough resources to fill a bucket, the size of which depends on the priority of the request, then returns that bucket of resources to the Fluxer. In this approach, TRAS is gathering a group of resources that are likely available but may not be. In the end, it is a combination of pseudo-randomization of the large pool of STRs and usage of local MTRs that achieves distribution of load among all transcoding resources.

In this embodiment, TRAS monitors the regional load of the MTRs it is managing. An MTR regularly updates the C-server with its queue load. TRAS periodically calculates the percentage of MTRs available, weighting them by their remaining capacity. An average is then calculated and used as a Regional Load Factor. For example if there are 10 MTRs each with a load of 10%, 20%, 30%, . . . 100%, then the algorithm would be as follows:
S1=1-0.1, S2=1-0.2, S3=1-0.2, . . . S10=1-1, (S1+S2+ S3+ . . . +S10)/10=0.45 (or 45% available; 55% current load)

This Regional Load Factor may be reported to any system attempting to determine the availability of work units for a given regional transcoding installation. The foregoing load-factor algorithm should not be viewed as limiting, as other algorithms may be used in other embodiments.

Fluxer

In the present embodiment, the Fluxers are the primary interface of the transcoding system to the outside world and the most common component for external clients to interact with. At a high-level, the purpose of the Fluxer is to break-up a video into segments, send those segments to one or more transcoders and reassemble those segments into the target container file. There are a number of low-level details involved in this function.

Fluxers provide several interfaces to support Live (real-time), VOD (batch) and VOD (real-time) use cases.

For Live, Fluxer live interfaces allow the Fluxer to transcode a live event by pulling a bitrate/format from an Archiver or Entry-Point, producing one or more transcoded bitrates/formats, and publishing all configured bitrates/formats to an Archiver or Streaming Mid-Tier. This activity is initiated by an HTTP Request to the Fluxer's live interface, containing the source Archiver set or Entry-Point, the target stream-id and the configuration for all derivative bitrates/formats. The initiating HTTP request causes the Fluxer to begin transcoding until the stream is torn-down.

Fluxer VOD interfaces, whether real-time or batch, are primarily implemented in the current embodiments as pull-based HTTP interface with the primary difference being how much of the file is transcoded at a given time. Regardless of the request being over the live or VOD interface, Fluxers generally wait to acknowledge jobs until they have obtained an initial set of resources from TRAS. If initial resource allocation fails, then the Fluxer can communicate that failure immediately regardless of a synchronous or asynchronous job.

Fluxer Live Interface

In this embodiment, Fluxer's live interface is a URL that triggers Fluxer activity but does not require that the initiator remain connected to the HTTP Socket, as the activity is ongoing and no feedback is required for the initiator. This allows a resource to ask a Fluxer to initiate transcoding of a live stream and to contact some number of additional Fluxers, asking them to monitor the primary. The initiation of this request typically contains the following information:

The source stream

The bitrate, height/width and transcoding configuration for each transcode of the live stream.

Figure 20:
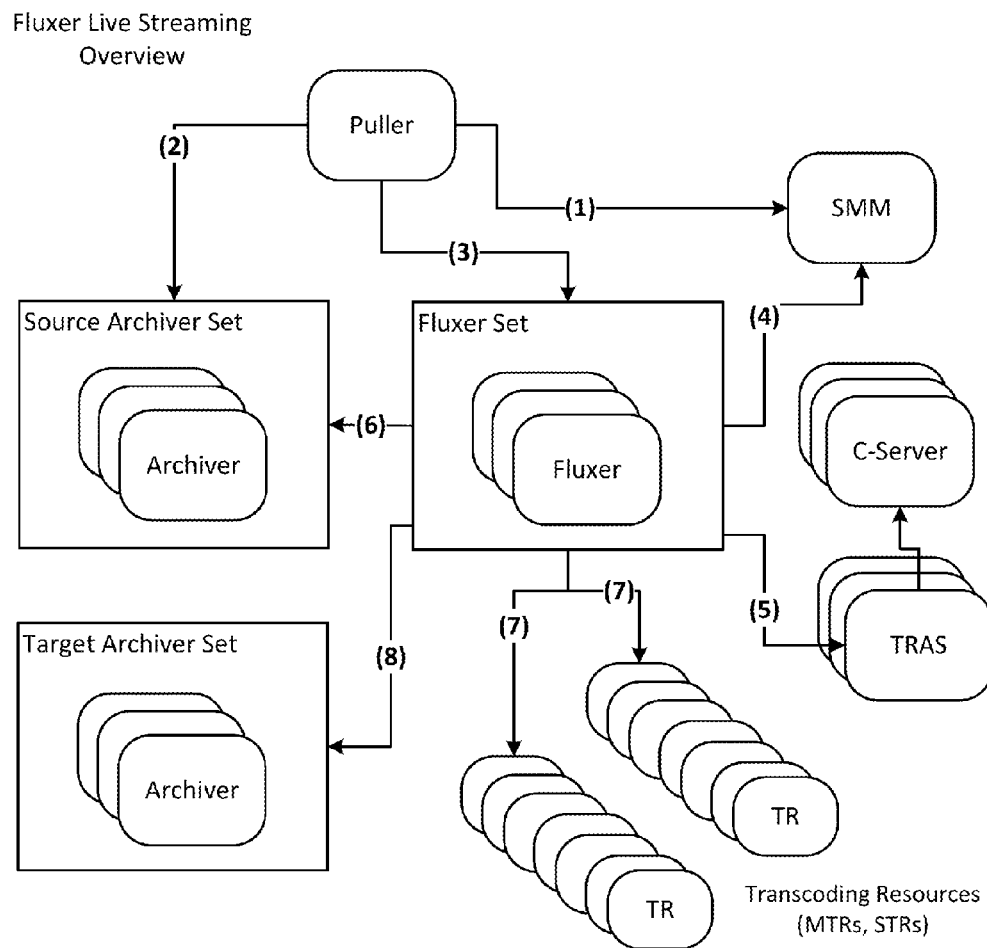
FIG. 20 illustrates an example of a workflow for live transcoding from the point of view of the Fluxer component, in accordance with the teachings hereof.

The list of additional Fluxers that together with the target make up the Fluxer Group FIG. 20 illustrates one embodiment of the operation of the Fluxer (and other system components) when transcoding a live stream. In step 1, the Puller contacts the streaming manifest manager and gets an Archiver set or Fluxer set. In step 2, the Puller contacts source Archiver, initiates a stream. In step 3, the Puller contacts first Fluxer from Fluxer Set and passes transcoding information. The contacted Fluxer then contacts remaining Fluxers in the set and they decide who will be the Mother and who will be Children. Transcoding parameters are communicated here. Fluxer Children begin monitoring the Mother. In step 4, the Mother Fluxer contacts SMM to get the Archiver set. In step 5, Fluxer contacts TRAS to get transcoding resources. In step 6, Fluxer initiates pull from Source Archiver. In step 7, the Mother Fluxer begins the parallel transcode of the stream being pulled from Source Archiver, utilizing the transcoding resources (TRs). In step 8, the Mother Fluxer re-assembles the transcoded segments and sends the transcoded stream to target Archiver set assigned by SMM for each bitrate.

Alternatively, the above operation can be performed with the live streaming components depicted in FIG. 5. In such a case, an Entry-Point locates a Fluxer and requests a transcode. The Entry-Point itself sources the stream to be transcoded, or points to the Fluxer to a Storage source stream using the metadata files described in connection with FIG. 8. The transcoded stream is sent to a streaming mid-tier SMT machine or to the Storage system, rather than an Archiver.

Should a Mother Fluxer fail, the Fluxer Children will begin an election to decide which Fluxer will assume the role of Mother. Election should prefer the Fluxer that is closer to the source of the stream. The new Mother will query at the target Archiver to confirm that the old Mother is no longer sending data and to retrieve the position of the last data received. The new Mother then assumes the Mother role and begins transcoding where the last Mother left off.

Figure 21:
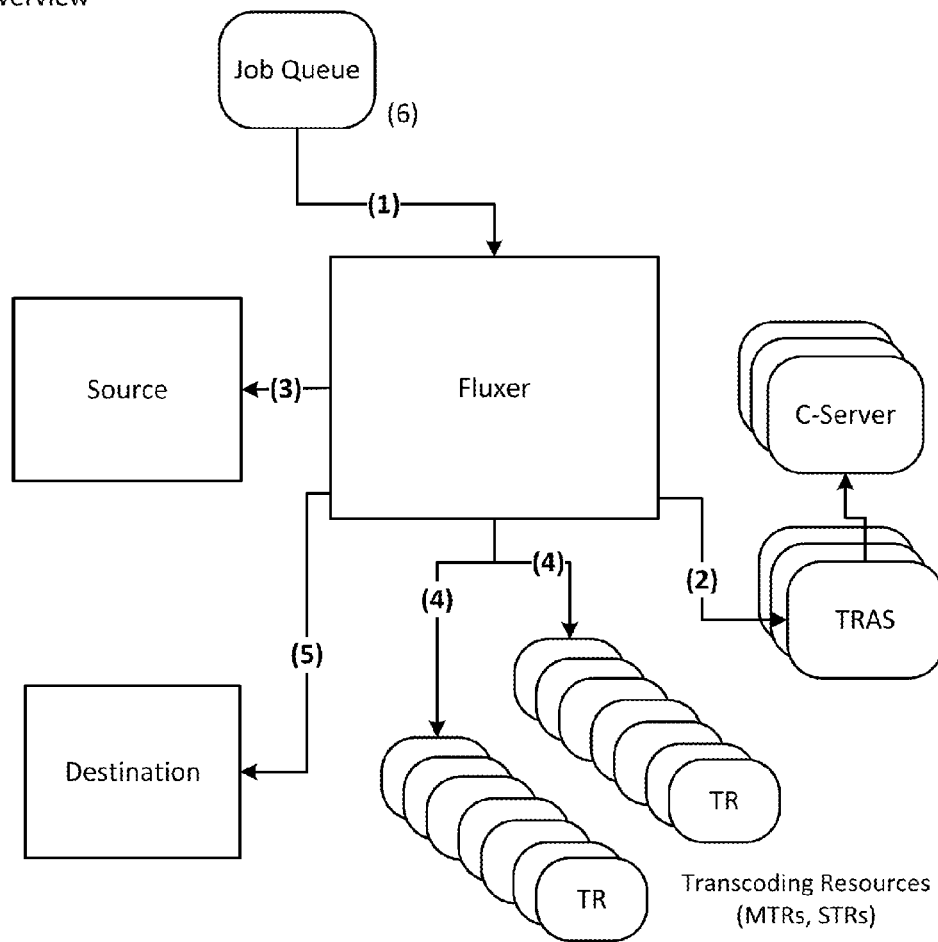
FIG. 21 illustrates an example of a workflow for batch video-on-demand transcoding from the point of view of the Fluxer component, in accordance with the teachings hereof.

FIG. 21 illustrates the operation of the Fluxer (and other system components) when transcoding a VOD stream in batch mode. In step 1, the Job Queue contacts Fluxer. (The Job Queue can exist as part storage system process, portal, or other component accessing the transcoding system.) In step 2, Fluxer contacts TRAS to get transcoding resources. In step 3, Fluxer pulls media from the source. In step 4, the Fluxer orchestrates the transcoding of the content using transcoders resources from TRAS. In step 5, the Fluxer posts transcoded content to a destination. In step 6, Job Queue removes the job.

In this implementation, the Job Source can pick a Fluxer at its own discretion however, preferably it chooses a Fluxer that is both idle and near the job source. In other implementations, the Mapping system can be used to determine the best Fluxer by sending a DNS request to a fluxer domain and receiving back from the Mapping system the IP address of a suitable Fluxer. Batch VOD Fluxer requests, although not prohibited from using MTRs, can be weighted to prefer using idle or low-usage STR transcoders.

Figure 22:
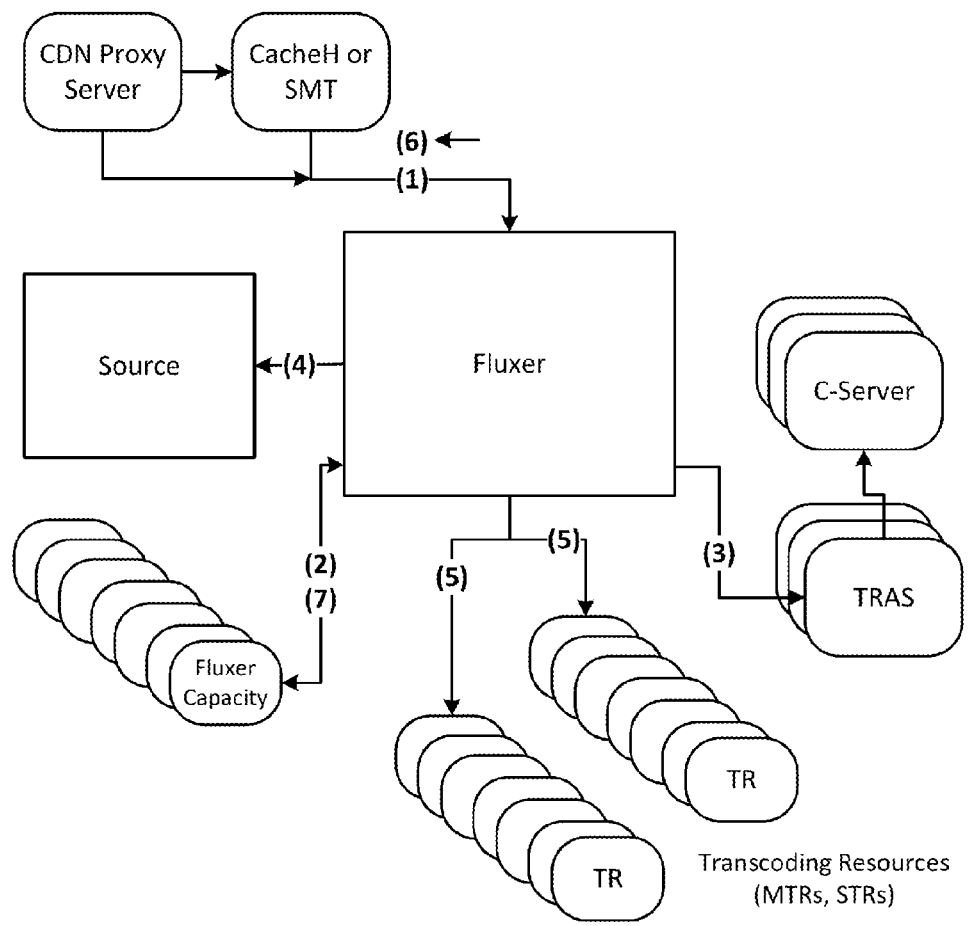
FIG. 22 illustrates an example of a workflow for real-time video-on-demand transcoding from the point of view of the Fluxer component, in accordance with the teachings hereof.

FIG. 22 illustrates the operation of the Fluxer (and other system components) when transcoding a VOD stream in real-time mode. In step 1, a request comes in to Fluxer from a CDN's content server (e.g., an HTTP proxy server as shown and described in connection with FIG. 1) that has received a user request for a file, or from a cache hierarchy region that has been asked for the content by the server (e.g., using a cache hierarchy technique as described in U.S. Pat. No. 7,376,716, the disclosure of which is incorporated herein by reference), or from a SMT machine (see, e.g., FIG. 12, where content server ghost has asked SMT machine in step (2) thereof for VOD content to satisfy request step (1) thereof). In step 2, assume Fluxer checks its transcoding region cache for requested segments of the content (which may correspond to, e.g., one or more IF fragments). Assume it receives a cache miss. In step 3, the Fluxer contacts TRAS to identify transcoding resources. In step 4, the Fluxer requests and receives the segments from the source (e.g., from storage or origin). In step 5, the Fluxer transcodes them using transcoding resources. In step 6, the Fluxer returns transcoded segments to the requesting component following re-assembly into a file or portion thereof. In step 7, the Fluxer begins workahead transcoding.

If the Fluxer determines that there is a region cache hit in step 2, then the Fluxer retrieves the trancoded segment from region cache, looking for a segment that is at least N seconds ahead of the requested segment (where N is determined by a configuration parameter). Fluxer either begins workahead or not depending on whether it can find sufficient number of segments in cache to meet the workahead criteria.

Thus, in the VOD real-time case, Fluxer works ahead of the anticipated requests in order to maintain a smooth experience for end users. Preferably, a content provider's configuration for real-time VOD transcoding contains a parameter which defines the number of segments to transcode ahead of the most current request, e.g., by indicating a number of seconds to work ahead. When a real-time VOD request comes to a Fluxer it can check to see if the required segments have already been transcoded and if so will begin delivering immediately while it performs the workahead of N segments based on the position of the request being served.

The following provides more detail about caching at a transcoding region. Caching proxy server functionality is employed locally on a Fluxer to maintain a cache-layer for the work performed in real-time. Once a request has been transcoded the derivative is cached locally within the transcoding region. The Fluxer leverages this feature by performing a lookahead request of N segments ahead of the current segment request. If a non-200 response code is returned by the local cache server for any of the N segments, Fluxer will respond by posting the required segment to a TR through its local cache server, resulting in caching of the transcoded response within the cache server layer.

The following describes optional pre-processing of media for VOD real-time case. Before allowing real-time transcoding of a VOD asset, some amount of work can be done to ensure that the media is prepped such that there is a standard starting point from which to begin transcoding. Pre-processing the media by transcoding the first few segments of a video means that the system can begin streaming immediately while the transcoder builds up a workahead buffer. Pre-processing typically includes the following actions:

Create an optimized version of the inbound file (optimized keyframe rate and bitrate)
Create an index of segment locations to byte-ranges
Produce the first N segments for each target bitrate The following describes an example of a process for identifying a Fluxer for VOD real-time workflows. A Mapper load-feedback property can be used to find appropriate Fluxers for real-time VOD transcoding. Preferably, real-time Fluxer requests use local MTR (dedicated) transcoder resources. Load-feedback from the Fluxer to the Mapper can include both the local Fluxer load and the regional transcoding resource load as well. Regional transcoder load estimation can be obtained from the Fluxer by making a call to TRAS to perform the "Regional Load Estimation", as described above in connection with the TRAS component, and thereby return a "Regional Load Factor" to the Fluxer.

Transcoding Resources (MTRs, STRs)

In the current example, the role of the transcoding resource (sometimes referred to herein as a "transcoder") is primarily to transcode segments of audio/video, or other content that needs to be transcoded. In one embodiment, a transcoding resource uses an HTTP-based API for receiving and transmitting segments. Typically, all transcoding resources are considered unreliable—and particularly STRs. A shared transcoding resource may terminate the transcode for any reason although if it terminates the transcode due to an error in the source media it preferably indicates that fact to the Fluxer, e.g., using an HTTP 415 Unsupported Media Type error, for example. If a Fluxer receives an unexpected disconnect from a transcoding resource (particularly an STR) it preferably ceases using that transcoding resource for at least a given time period, to prevent impacting STRs that are delivering content in the CDN.

Put another way, load is a concern for STRs, as they are typically the HTTP proxy servers running in the CDN and delivering content to end users in FIGS. 1-16, since the integrity of the delivery network is preferably protected. The process managing the transcoding on the STR is configured to avoid impact to the STR. STRs monitor their local environment and terminate jobs if the environment becomes constrained. In the STR environment, the HTTP proxy server (ghost) process is considered more important than the transcoding process. STRs run a process "manager" which in turn runs and monitors the actual transcoding server as a child process. This "manager" may take any of several steps to "lock-down" the transcoding process such as using LD_PRELOAD to block dangerous system calls, chrooting the process and monitoring the process for excessive runtime and/or CPU consumption.

Figure 23:
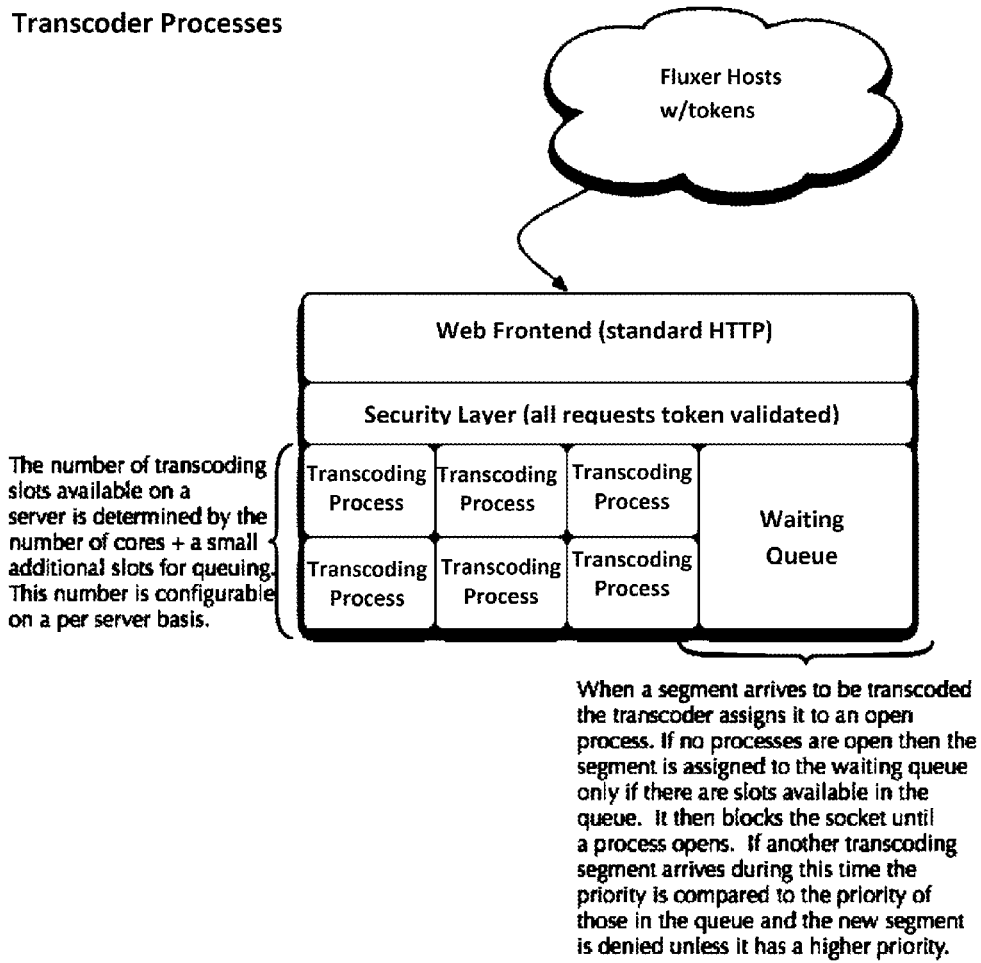
FIG. 23 is a diagram illustrating examples of certain transcoding processes executing in a server functioning as a transcoding resource, in accordance with the teachings hereof.

FIG. 23 provides an overview of processes executing on a transcoding resource (excluding HTTP proxy processes for content delivery).

In one embodiment, a client (e.g., a Fluxer) can communicate with transcoding resources using an HTTP 100 Expect/Continue workflow. This is preferable because a transcoding resource may not be able to handle any work and it is useless and wasteful to send an entire segment only to be denied. A transcoding resource may block for a period of time before sending a 100 Continue response to a requesting client but also preferably responds immediately if unable to handle the request.

In the current implementation, transcoding resources accept transcoding segments that are chunks or pseudo-chunks for transcoding.

Regardless of a transcoding resource's role as either a MTR or a STR, in the current embodiment, transcoders are generally considered unreliable by the Fluxers. As noted previously, a Fluxer receives a list of transcoding resources so that it may begin to send segments to them. Without a large, global, fine-grained, resource allocation system, it would be impossible to have a high degree of certainty that a given transcoding resource will accept a segment to transcode. Moreover, transcoding resources run on commodity hardware, so failure of a transcoding resource during the transcoding process is not only a possibility but may even be likely at some point across the transcoding system. For this reason, it is simpler to adopt an unreliable view of transcoding resources. This view also simplifies the transcoding resource implementation. If the transcoding resource is overloaded, it is sufficient and acceptable for that transcoding resource to simply deny any inbound transcoding requests until the load drops below a threshold. Should a transcoding resource process be leveraging idle CPU on a machine with a more important role, such as an STR, it is sufficient to simply "go away" if the resources being consumed by the transcoding resource become needed. In response to a deny or an unexpected socket close, the Fluxer preferably sends the segment to an alternate transcoding resource. However, if the transcoding resource returns an actual error about the source bits (e.g. some fatal error with the original encode) then the Fluxer may send the segment to another transcoding resource or it may give up on the segment altogether, failing the transcode.

Identification of possible transcoding resources to use for a particular job is now described. Possible transcoders are identified from a pool of available transcoding resources in one of a few ways. For STRs that represent HTTP proxy servers somewhere in the delivery network, Mapper is used to provide a map that can return a list of possible resources which appear to be under a given load threshold, as mentioned above. This is provided over a DNS interface with the parameters encoded into the requesting hostname. This DNS request may return a large number of possible hosts—more than that associated with a typical DNS lookup in the delivery network. As noted, STRs returned are considered volatile and may accept or reject the request based on their own local load.

A non-limiting, exemplary approach for an internal queue of a transcoding resource is described as follows. Transcoding resources can have a fixed number of "slots" which is made up of two counters and indicates the number of individual transcode-segment requests that may be accepted by that transcoding resource at any given period of time. One counter is the "available-process" counter and is some sub-percentage of the number of available cores on the system. The other counter is the "queue" counter and is some configurable number of additional tasks that are allowed to be waiting but not actively being worked on. Both of these factors are reactive to the hardware the transcoding resource is installed on and both are configurable. For example, an available-process factor of 0.5 (or 50% of system cores) and a queue counter of 0.10 (or 10% of cores). Taken together, these two counters make up the total number of available "slots" for a given transcoding resource.

As a transcoding resource is accepting work it continues to accept requests to transcode segments so long as it has available processes and/or slots. Should the transcoding resource be completely full, it denies the request with a HTTP 503 Service Unavailable error. A 100 Expect/Continue method is otherwise used to ensure that the request is valid and that the transcoding resource has an available process to perform the requested action. If the processes are all allocated and an inbound Fluxer request lands on a queue slot then the transcoding resource should block its "CONTINUE" response until the queue slot becomes assigned to a process.

Batch VOD Queuing

The queuing of VOD batch requests is now described. A queuing system exists to request files be transcoded at the earliest possible convenience. This queue contains a list of jobs that define a source, a transcode profile and a destination and will be executed on as soon as possible given the resources available. The queue itself is quite simple, can be distributed into many sub-queues and will mostly be used by some user interface to provide batch-transcoding services for bitrates that a content provider wishes to crate and have stored for later delivery. Upon waking up, the local queue manager will simply take the top N jobs off the stack and make required batch requests to the Fluxers, allowing the transcoding system to work to complete the transcoding job. Multiple queues may be running within a given transcoding region, typically running on the same hardware that is running the Fluxer or TRAS code.

Examples of jobs which the transcoding system is configured to support may include the following (which are non-limiting examples):

Conversion to the following video codecs: h.264, theora, vp8

Conversion to the following audio codecs: mp3, aac, vorbis

Conversion to the following containers: mp4-standard, mp4-fragmented, fly, IF (intermediate format as described previously)

Conversion from the following video codecs: h.264, mpeg1, mpeg2, VC1, theora, VP3/6/8, DV Conversion from the following audio codecs: aac, mp3, mpa, pcm, vorbis Conversion from the following containers: mpeg2ts, mpeg2ps, mpeg1, avi, mp4, wmv/asf, mp3, WEBM/Matroska The transcoding system also preferably supports the application of filters and scalers (i.e. deinterlacing and frame-scaling).

Further Embodiments and Applications

While some of the foregoing examples have focused on converting media formats, codecs, and the like, the system described herein is not limited to such. The teachings above may be extended so as to provide a distributed platform for applying security or rights management schemes to content. For example, the system above may be modified by having the Fluxer receive requests (by way of illustration) to apply a given encryption algorithm to a file. The Fluxer can break up the file into segments that are each to be encrypted, and delegate the tasks of doing so to distributed MTRs and STRs, as described above. In sum, the nature of the assigned task may change but the system still operates similarly. Other tasks might include embedding a watermark in the content, or inserting data to apply a digital rights management scheme to the file. In other embodiments, system can receive an end-user client request for content, discern information about the end-user client (client IP address, user-agent, user-id, other identifier, etc.) and incorporate that data into a fingerprint that is inserted into the content in real-time, leveraging the real-time transcoding flow described above (e.g., FIG. 22) to convert the file on the fly. Hence, the content can be marked with information related to the end-user (or client machine) to whom it was delivered. In some use cases, it may be preferable not to break the original file apart but rather assign the entire file transcoding job to a particular MTR or STR, perhaps with low priority, so that the assigned machine has all the data in the file to work with in performing its task.

Creating Transcoding Segments from an Input (Pseudo-Chunking)

The following presents examples of how the Fluxer can break apart incoming files into transcoding segments, and more particularly how it can break apart incoming video files.

The embodiments described above provide a transcoding system that implements segmented parallel encoding for video and other content. For video, segmented parallel encoding typically makes the tradeoff of inflexible keyframe intervals for the speed of encoding videos using a large number of encoders operating in parallel. If keyframe intervals are not altered then the boundary of a keyframe may be considered a chunk or segment and treated independently of other chunks. By breaking up a video into segments and submitting those segments in parallel to multiple transcoding resources, the transcode can be parallelized, increasing its speed relative to the number of encoders and reduce the encoding time to the minimum of (demuxing_time+slowest_segment_encode_time+re-muxing_time).

Codecs enable the compression of video by taking advantage of the similarity between frames. Generally speaking, there are 3 types of frames that are used to varying degrees in different codecs: I-frames (aka, keyframes), P-frames and B-frames. In general, and as mentioned previously, I-frames can be thought of as a stand-alone frame that contains the complete information to construct a complete frame on its own. P-frames reference essentially what has changed between itself and the previous frame while B-frames can refer to frames ahead of them or behind them. The group of frames that starts with an I-frame and ends with the last frame before the next I-frame is often referred to as a Group Of Pictures or "GoP". Hence, a video that is encoded as a Closed-GoP video means that each GoP can be treated independently from the others.

A container generally refers to a file that wraps the raw encoded bits of media (e.g., audio, video) and may provide indexing, seekability and metadata. Typically, a container divides the raw bits into "packets" which may contain one or more frames. A frame typically has a frame-type of audio, video or a number of less-frequent possibilities such as subtitles and sprites. For video, these frames each correspond to the type of frames mentioned above, I-Frame, B-Frame, P-Frame, etc. There are a large number of different containers and each may have a little different way of getting at the raw media data.

In sequential encoding (as opposed to parallelized encoding), all frames can be considered in a sequence (or with some parallelism resulting from a multi-threaded computer architecture) and an approach derived across a large number of frames. When encoding in this manner, it is relatively trivial to do things such as modify the GoP size because there is always enough information available to create an I-frame (since the entire stream is available). When parallelizing encodes in a cloud (where multiple servers are involved, as can occur with the transcoding system presented herein), making modifications to the GoP size can become more problematic. If, for example, the request is to reduce the GoP size to a non-factor of the original GoP size then the I-frames will no longer be aligned.

The following describes some examples of kinds of complications when parallelizing encodes and a pseudo-chunking approach to solve them.

GoP Size Modification. GoP size modification becomes complicated with parallelizing transcodes to multiple processors. For example, if a typical encode has a GoP size of 250 frames (8.34 seconds of NTSC Video), this can be an issue for high-keyframe-rates, which may be present, e.g., in HD video formats. If a HD or other video format is desired to run 2-3 seconds between keyframes (approximately 60-90 frames in the GoP), neither 60 or 90 frames can be evenly divided into the 250 frame/second source keyframe rate. Solving this problem involves maintaining some kind of alignment over how many frames will be required to decode the frames necessary to produce a keyframe at an unusual time.

Figures 24, 25:
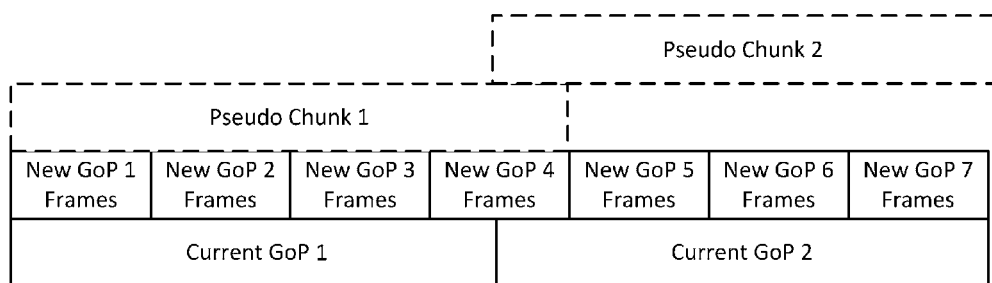
FIG. 24 is a diagram illustrating modification of group-of-picture (GoP) size as part of a transcoding job.
FIG. 25 is a diagram illustrating an example of a pseudo-chunking approach for transcoding, in according with the teachings hereof; and, FIG. 26 is a diagram that illustrates hardware in a computer system that may be used to implement the teachings hereof.

For example, and with reference to FIG. 24, assume a current GoP size of 250 frames and a target-GoP size of 90 frames. As a result, NEWGoP1 will be frames 1-90, and needs frames 1-90 to be able to be re-encoded, NEWGoP2 will be from frame 91-180 and needs frames 1-180 to be able to be re-encoded. NEWGoP3 will be from frames 180 to 270 and will therefore need frames 1-270 to be able to be re-encoded. Notice, we've crossed into a new GoP now. NEWGoP3 will have to start with the first GoP and need several frames from the second GoP in order to be encoded. NEWGoP4 doesn't have this problem, it will be made up of frames 271-360 and therefore only needs frames 251-360 in order to start from a keyframe and encode its bits. FIG. 24 illustrates this scenario.

A pseudo-chunking approach can address this issue by, in one embodiment, allowing for segments that are not aligned to keyframes or GoPs. A pseudo-chunk may be larger or smaller than a GoP. In the above example, the segmenter (e.g., the Fluxer) can create a pseudo-chunk that extends past the Current GoP to reach the end of NewGoP3.

Note that when dealing with GoP modification, it's often preferable to allow the encoder to produce multiple GoPs from a single source GoP. One usually wouldn't want to transfer one GoP three times just to get three new GoPs, when you could transfer one GoP+a few frames of the second (the entire pseudo-chunk) and receive back three GoPs.

Pseudo-chunking also applies to scene change detection, and more particularly, to situations where there are frequent scene changes in a video file. A scene change refers to an interruption in the regular sequence of keyframes. It typically exists because enough has changed from one frame to the next that a P or B frame becomes impractical, i.e., there is enough difference between frames for the encoder to place an additional keyframe in-line for quality sake. Most modern encoders contain some threshold for inserting extra keyframes on scene changes in order to optimize the encoding experience. Scene-changes can present a problem if too simplistic of an algorithm is used when segmenting, such as simply splitting on keyframes. When many scene-change keyframes are present it could cause too-small a fragment to be used for the encoders and could actually slow down parallel transcodes. A pseudo-chunking approach, in which pseudo-chunks may span more than one keyframe in appropriate circumstances, can address this issue (e.g., by including some predetermined minimum number of frames/time in the pseudo-chunk segment, regardless of keyframe intervals).

Pseudo-chunking addresses open GoP encoding as well. Typically, a GoP ends with a P-frame (which references a previous frame). This is a closed GoP. However, it's possible to end a GoP with a B-frame, which could refer to the next frame in the next GoP (the starting I-Frame). When this occurs it is referred to as an open-GoP. An open-GoP presents a problem over a closed-GoP when parallelizing encodes because some amount of the next GoP is required to complete the encode.

Details on Pseudo-Chunking Approach

In one embodiment, a device managing the transcode (such as the Fluxer in the transcoding system previously described) is configured to be aware of what frames it needs to use, as a subset of those received, to produce a new transcode. For example, the Fluxer will look at a frame to determine what kind of frame it is (B-frame, P-frame, keyframe, etc., Closed-GoP situation, etc.), understand what GoP size it needs to target. It is frame-aware. Hence, the Fluxer has intelligence to create pseudo-chunks, rather than blindly segmenting on keyframes. It can then include the appropriate coded frames in a pseudo chunk, so that the transcoding resource has all the data it needs to decode, convert the data, and re-encode as required.

As explained above, a pseudo chunk may be either a partial or super-GoP. A pseudo chunk is used as a unit of data that is transferred from a Fluxer to a transcoder and may not include the entire GoP if the entire GoP is not required for transcoding the target number of frames. A pseudo chunk may also contain more frames then a given GoP in the case of an Open GoP condition or if the target keyframe interval is sufficiently different from the source keyframe interval. So a pseudo-chunk is not necessarily aligned with a GoP, and may extend past the original GoP boundary or not reach that far.

FIG. 25 illustrates an example of pseudo-chunking to change the GoP size in a given video file. In this example, the pseudo-chunk starts at a keyframe boundary and continues past the Current GoP (the original GoP) until enough frames are included to construct the New GoP that bridges the boundary between Current GoP 1 and Current GoP 2. Given a video that is 1 frame per second and has a 10 second GoP we have a GoP every 10 frames (1-10, 11-20, 21-30, etc. . . . ). For illustrative purposes, assume Current GoPs 1 and 2 are such GoPs with 10 frames each. If we needed to reduce the Current GoP size to 3 seconds then our New GoPs would be at frames 1-3 (New GoP1), 4-6 (New GoP2), 7-9 (New GoP3), 10-12 (New GoP4). That last new GoP (i.e., New GoP4 in FIG. 24) is a problem because frame 10 belongs to Current GoP 1 while frame 11 belongs to Current GoP 2. We need to send a chunk of data to the transcoding resource that includes the entire Current GoP 1 and two frames of Current GoP 2 in order to have enough frame data at the transcoding resource to encode the New GoP4 at frames 10-12. This chunk of data is represented by Pseudo Chunk 1 in FIG. 24. Also note that the Fluxer preferably ensures that the last frame of the pseudo-chunk is not a B-frame referring to a frame ahead of it. If it is, then another frame(s) may need to be included in Pseudo Chunk 1.

Another aspect of pseudo-chunking involves including both the starting and ending keyframes to deal with open GOP situations. Typically, with sequential encoding, one would only need the frames that are desired to be encoded— and the keyframe of the next GOP is unnecessary—but in parallel transcoding case, and with a "frame-aware" Fluxer, one can and should send the extra frame. To do this, the Fluxer ensures that our pseudo-chunks always start on a keyframe and continue past the frame-number of the last needed frame to the point that there are either no further forward-looking B-frames or it encounters the next keyframe.

Finally, a pseudo-chunking Fluxer can mitigate the effects of frequent scene changes, which can produce transcoding segments that are too small, by applying certain thresholds (minimum number of frames for a segment) in the pseudo-chunking process.

In one implementation, for every batch transcode, Fluxer can produce an index file describing the breakup of all pseudo chunks produced, for the input audio and video tracks, called a "Chunk Index Header". This file can be used for accelerating real-time transcodes by identifying the individual pseudo chunks for the particular input and what byte-offsets they occupy in the file, making retrieval of discrete units easier.

It should be understood that pseudo-chunking is not limited to the applications described above, nor is it limited to use by a Fluxer described herein. Any module charged with segmenting a file for encoding may employ pseudo-chunking. Further, other forms of media, particularly those that utilize atomic data that references other data in a stream (as do B-frames, P-frames, etc.)

Computer-Based Implementation

The clients, servers, and other devices described herein may be implemented with conventional computer systems, as modified by the teachings hereof, with the functional characteristics described above realized in special-purpose hardware, general-purpose hardware configured by software stored therein for special purposes, or a combination thereof.

Software may include one or several discrete programs. Any given function may comprise part of any given module, process, execution thread, or other such programming construct. Generalizing, each function described above may be implemented as computer code, namely, as a set of computer instructions, executable in one or more processors to provide a special purpose machine. The code may be executed using conventional apparatus—such as a processor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 26:
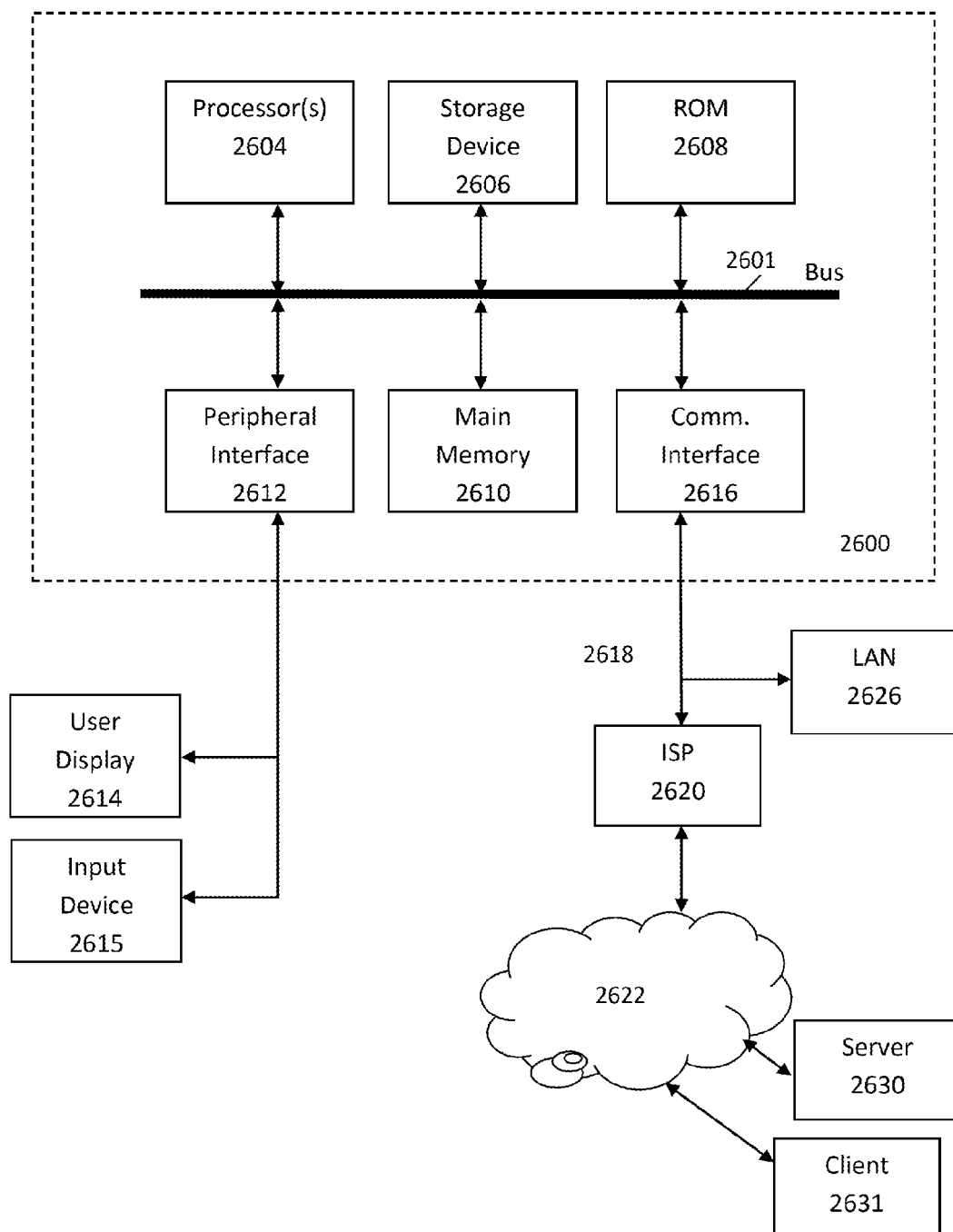

FIG. 26 is a block diagram that illustrates hardware in a computer system 2600 upon which such software may run in order to implement embodiments of the invention. The computer system 2600 may be embodied in a client device, server, personal computer, workstation, tablet computer, wireless device, mobile device, network device, router, hub, gateway, or other device. Representative machines on which the subject matter herein is provided may be Intel Pentium-based computers running a Linux or Linux-variant operating system and one or more applications to carry out the described functionality.

Computer system 2600 includes a processor 2604 coupled to bus 2601. In some systems, multiple processor and/or processor cores may be employed. Computer system 2600 further includes a main memory 2610, such as a random access memory (RAM) or other storage device, coupled to the bus 2601 for storing information and instructions to be executed by processor 2604. A read only memory (ROM) 2608 is coupled to the bus 2601 for storing information and instructions for processor 2604. A non-volatile storage device 2606, such as a magnetic disk, solid state memory (e.g., flash memory), or optical disk, is provided and coupled to bus 2601 for storing information and instructions. Other application-specific integrated circuits (ASICs), field programmable gate arrays (FPGAs) or circuitry may be included in the computer system 2600 to perform functions described herein.

Although the computer system 2600 is often managed remotely via a communication interface 2616, for local administration purposes the system 2600 may have a peripheral interface 2612 communicatively couples computer system 2600 to a user display 2614 that displays the output of software executing on the computer system, and an input device 2615 (e.g., a keyboard, mouse, trackpad, touchscreen) that communicates user input and instructions to the computer system 2600. The peripheral interface 2612 may include interface circuitry, control and/or level-shifting logic for local buses such as RS-485, Universal Serial Bus (USB), IEEE 1394, or other communication links.

Computer system 2600 is coupled to a communication interface 2616 that provides a link (e.g., at a physical layer, data link layer, or otherwise) between the system bus 2601 and an external communication link. The communication interface 2616 provides a network link 2618. The communication interface 2616 may represent a Ethernet or other network interface card (NIC), a wireless interface, modem, an optical interface, or other kind of input/output interface.

Network link 2618 provides data communication through one or more networks to other devices. Such devices include other computer systems that are part of a local area network (LAN) 2626. Furthermore, the network link 2618 provides a link, via an internet service provider (ISP) 2620, to the Internet 2622. In turn, the Internet 2622 may provide a link to other computing systems such as a remote server 2630 and/or a remote client 2631. Network link 2618 and such networks may transmit data using packet-switched, circuit-switched, or other data-transmission approaches.

In operation, the computer system 2600 may implement the functionality described herein as a result of the processor executing code. Such code may be read from or stored on a non-transitory computer-readable medium, such as memory 2610, ROM 2608, or storage device 2606. Other forms of non-transitory computer-readable media include disks, tapes, magnetic media, CD-ROMs, optical media, RAM, PROM, EPROM, and EEPROM. Any other non-transitory computer-readable medium may be employed. Executing code may also be read from network link 2618 (e.g., following storage in an interface buffer, local memory, or other circuitry).

The invention claimed is:

1. A distributed computing system for transcoding content in parallel on a plurality of machines coupled via a computer network, the system comprising:
    a first machine programmed to assist in transcoding and running a first transcoding process, the first machine comprising circuitry including one or more processors and a memory device, and the memory device storing computer program instructions, the one or more processors executing the computer program instructions and providing the first transcoding process;
    a second machine programmed to assist in transcoding and running a second transcoding process, the second machine comprising circuitry including one or more processors and a memory device, and the memory device storing computer program instructions, the one or more processors executing the computer program instructions and providing the second transcoding process;
    a third machine programmed to manage and coordinate transcoding processes, the third machine comprising circuitry including one or more processors and a memory device, and the memory device storing computer program instructions, the one or more processors executing the computer program instructions and providing the management and coordination of transcoding processes;
        wherein, upon execution of the instructions, the third machine receives a request to perform a transcoding process, the request comprising a request to convert a file from a first version to a second version, the first version being an original version of the file and the second version being an output file of the requested transcoding process;
        wherein, upon execution of the instructions, the third machine receives the first version of the file, the file comprising a first plurality of video frames organized into a plurality of groups-of-pictures (GoPs), each of the first plurality of GoPs beginning with an I-frame and further including at least one of: a B frame and a P frame;
        wherein the requested transcoding process comprises requesting conversion of the first version of the file to a second version of the file that comprises a second plurality of GoPs, each of the second plurality of GoPs beginning with an I-frame and further including at least one of: a B frame and a P frame;
        wherein, upon execution of the instructions, the third machine determines that a particular GoP, which is one of the first plurality of GoPs in the received first version of the file, is an open GoP, wherein an open GoP is a GoP ending with a B-frame, and based at least in part upon said determination:
            creates a first segment from the received first version of the file, the first segment consisting of all frames in the particular GoP, and the I-frame that begins the GoP immediately following the particular GoP in the first version of the file, and sends the first segment to the first machine;
        wherein, upon execution of the instructions, the third machine further creates a second segment from the received first version of the file, the second segment comprising all frames in another GoP, which is another one of the first plurality of GoPs in the received first version of the file, and is distinct from the particular GoP and sends the second segment to the second machine;
    the first machine comprising the one or more processors and the memory device thereof, the memory device storing computer program instructions that, upon execution by the one or more processors, cause the first machine to execute the first transcoding process to receive the first segment from the third machine, and from the first segment create a particular one of the second plurality of GoPs for the second version of the file, whereby increasing transcoding speed relative to the number of encoders and reducing the encoding time;
    the second machine comprising the one or more processors and the memory device thereof, the memory device storing computer program instructions that, upon execution by the one or more processors, cause the second machine to execute the second transcoding process to receive the second segment from the third machine, and from the second segment create another one of the second plurality of GoPs for the second version of the file, distinct from the particular one of the second GoPs created by the first machine, whereby increasing transcoding speed relative to the number of encoders and reducing the encoding time.

2. The distributed computing system of claim 1, wherein the requested transcoding process comprises changing one or more characteristics of the file, the one or more characteristics comprising any of: a codec used to encode data in the file, a container format of the file, one or more encoding parameters, container format parameters, a bit-rate of encoded data in a file, an image resolution for data in a file, a frame size for data in a file, an aspect ratio for data in a file, a compression setting used to encode data in a file, an audio setting, a color space, and, an interlacing characteristic for data in a file.

3. A method performed in a distributed computing system for transcoding content in parallel on a plurality of machines coupled via a computer network, the distributed computing system comprising a first machine programmed to assist in transcoding and running a first transcoding process, the first machine comprising circuitry including one or more processors and a memory device, and the memory device storing computer program instructions, the one or more processors executing the computer program instructions and providing the first transcoding process, a second machine programmed to assist in transcoding and running a second transcoding process, the second machine comprising circuitry including one or more processors and a memory device, and the memory device storing computer program instructions, the one or more processors executing the computer program instructions and providing the second transcoding process, and a third machine programmed to manage and coordinate the transcoding process, the third machine comprising circuitry including one or more processors and a memory device, the memory device storing computer program instructions, the one or more processors executing the computer program instructions and operating the third machine, the method comprising:
  upon execution of the computer program instructions of the third machine, the third machine:
    receiving a request to perform a transcoding process, the request comprising a request to convert a file from a first version to a second version, the first version being the original version of the file and the second version being the output file of the requested transcoding process;
    receiving the first version of the file, the file comprising a first plurality of video frames organized into a plurality of groups-of-pictures (GoPs), each of the first plurality of GoPs beginning with an I-frame and further including at least one of: a B frame and a P frame;
  wherein the requested transcoding process comprises requesting conversion of the first version of the file to a second version of the file that comprises a second plurality of GoPs, each of the second plurality of GoPs beginning with an I-frame and further including at least one of: a B frame and a P frame;
  determining that a particular GoP, which is one of the first plurality of GoPs in the received first version of the file, is an open GoP, wherein an open GoP is a GoP ending with a B-frame, and based at least in part upon said determination:
    creating a first segment from the received first version of the file, the first segment consisting of all frames in the particular GoP and the I-frame that begins the GoP immediately following the particular GoP in the first version of the file, and sending the first segment to the first machine;
    creating a second segment from the received first version of the file, the second segment comprising all frames in another GoP, which is another one of the first plurality of GoPs in the received first version of the file, and is distinct from the particular GoP;
    sending the second segment to the second machine;
  upon execution of the computer program instructions of the first machine, the first machine receiving the first segment from the third machine, and from the first segment creating a particular one of the second plurality of GoPs for the second version of the file, whereby increasing transcoding speed relative to the number of encoders and reducing the encoding time;
  upon execution of the computer program instructions of the second machine, the second machine receiving the second segment from the third machine, and from the second segment creating another one of the second plurality of GoPs for the second version of the file, distinct from the particular one of the second plurality of GoPs created by the first machine, whereby increasing transcoding speed relative to the number of encoders and reducing the encoding time.

4. The method of claim 3, wherein the requested transcoding process comprises changing one or more characteristics of the file, the one or more characteristics comprising any of: a codec used to encode data in the file, a container format of the file, one or more encoding parameters, container format parameters, a bit-rate of encoded data in a file, an image resolution for data in a file, a frame size for data in a file, an aspect ratio for data in a file, a compression setting used to encode data in a file, an audio setting, a color space, and, an interlacing characteristic for data in a file.

* * * * *